US012632057B2

(12) United States Patent　　　(10) Patent No.: US 12,632,057 B2
Iriya　　　(45) Date of Patent: May 19, 2026

(54) INFORMATION PROCESSING METHOD, INFORMATION PROCESSING DEVICE, COMPUTER-READABLE MEDIUM, AND IMAGING SYSTEM

(71) Applicant: Sony Group Corporation, Tokyo (JP)

(72) Inventor: Shinichi Iriya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 199 days.

(21) Appl. No.: 18/551,871

(22) PCT Filed: Feb. 17, 2022

(86) PCT No.: PCT/JP2022/006477
§ 371 (c)(1),
(2) Date: Sep. 22, 2023

(87) PCT Pub. No.: WO2022/209398
PCT Pub. Date: Oct. 6, 2022

(65) Prior Publication Data
US 2024/0201698 A1　　Jun. 20, 2024

(30) Foreign Application Priority Data
Mar. 30, 2021　(JP) ................................. 2021-057347

(51) Int. Cl.
*G05D 1/223* (2024.01)
*B64U 101/30* (2023.01)
(Continued)

(52) U.S. Cl.
CPC ......... *G05D 1/2232* (2024.01); *G05D 1/2246* (2024.01); *G05D 1/689* (2024.01);
(Continued)

(58) Field of Classification Search
CPC .... G05D 1/2232; G05D 1/2246; G05D 1/689; G05D 2109/254; G05D 2105/345;
(Continued)

(56) References Cited

U.S. PATENT DOCUMENTS

2017/0076612 A1* 3/2017 Takahashi ................ G08G 5/26
2021/0287559 A1* 9/2021 Jeong ....................... G08G 5/57

FOREIGN PATENT DOCUMENTS

JP　　2007259485 A　* 10/2007
JP　　2014120645 A　　6/2014
(Continued)

OTHER PUBLICATIONS

Machine Translation of JP2007259485A (Year: 2007).*
(Continued)

*Primary Examiner* — Brandon D Lee
(74) *Attorney, Agent, or Firm* — XSENSUS LLP

(57) ABSTRACT

An information processing device and a corresponding information processing method that includes: causing a display to display a plurality of template objects schematically illustrating flight patterns; and generating a control signal for a flight vehicle on the basis of flight control information including information on a flight route corresponding to a plurality of selected template objects selected from among the plurality of template objects.

16 Claims, 22 Drawing Sheets

(51) Int. Cl.

| | |
|---|---|
| *G05D 1/224* | (2024.01) |
| *G05D 1/689* | (2024.01) |
| *G05D 109/25* | (2024.01) |
| *G06F 3/0482* | (2013.01) |
| *G06F 3/0484* | (2022.01) |
| *H04N 7/18* | (2006.01) |

(52) U.S. Cl.

CPC .......... *G06F 3/0482* (2013.01); *G06F 3/0484* (2013.01); *H04N 7/183* (2013.01); *B64U 2101/30* (2023.01); *B64U 2201/10* (2023.01); *G05D 2109/254* (2024.01)

(58) Field of Classification Search

CPC .... G06F 3/0482; G06F 3/0484; G06F 3/0486; G06F 3/0488; H04N 7/183; B64U 2101/30; B64U 2201/10; B64U 2201/20; G08G 5/22; G08G 5/26; G08G 5/57; G08G 5/55; G01C 21/20

See application file for complete search history.

(56) References Cited

FOREIGN PATENT DOCUMENTS

| | | | |
|---|---|---|---|
| JP | 2016184288 | A | 10/2016 |
| JP | 2018-173992 | A | 11/2018 |
| JP | 2018-196064 | A | 12/2018 |
| JP | 6777121 | B2 | 10/2020 |
| JP | 6818379 | B1 | 1/2021 |
| WO | 2019/098016 | A1 | 5/2019 |
| WO | WO-2020026622 | A1 | 2/2020 |

OTHER PUBLICATIONS

DronesPerHour, "Webinar Grundlagen", Jan. 14, 2022 (Jan. 14, 2022), XP093173847, Retrieved from the Internet: URL:https://www.youtube.com/watch?v=dsx4M3xqA_s, pp. 1-2.

International Search Report and Written Opinion mailed on Mar. 22, 2022, received for PCT Application PCT/JP2022/006477, filed on Feb. 17, 2022, 9 pages including English Translation.

* cited by examiner

Figures 4, 5:
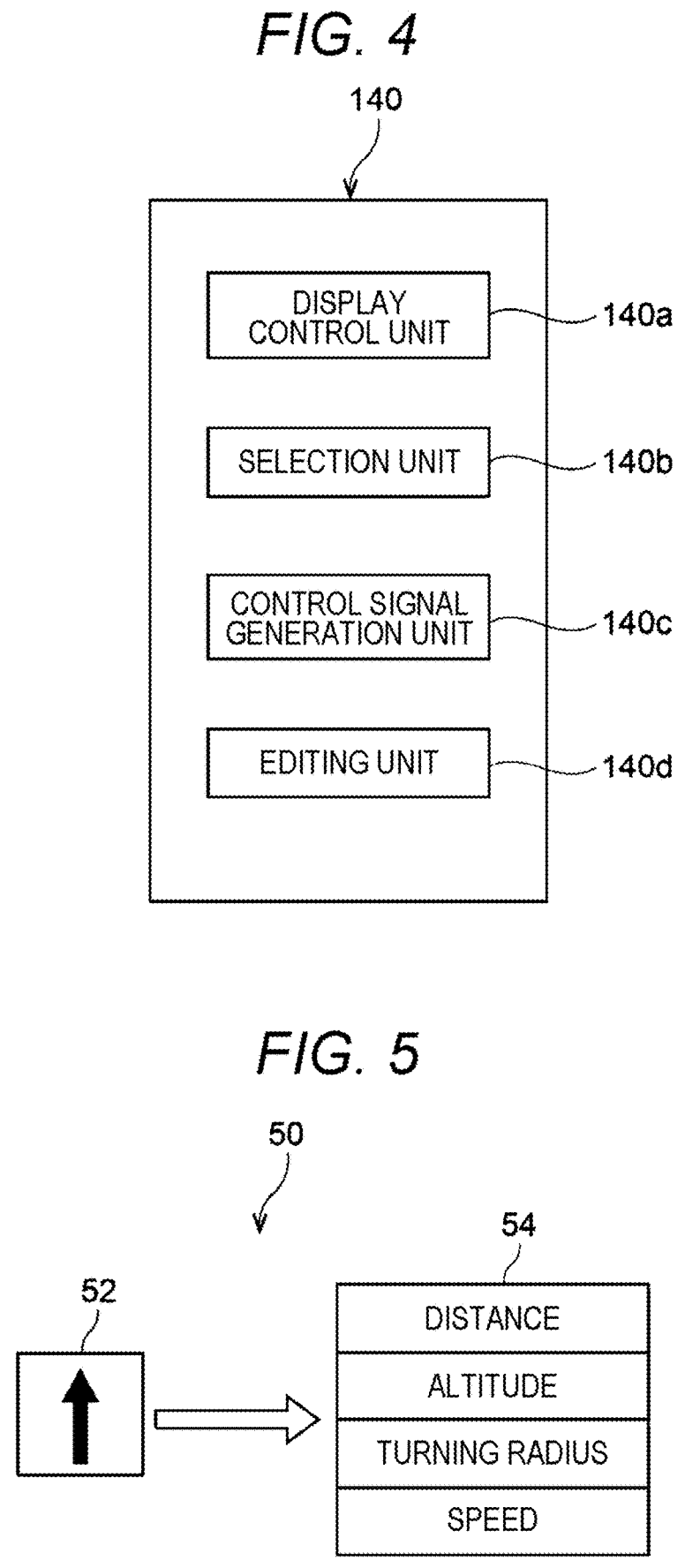

| | |
|---|---|
| DISPLAY CONTROL UNIT | 140a |
| SELECTION UNIT | 140b |
| CONTROL SIGNAL GENERATION UNIT | 140c |
| EDITING UNIT | 140d |

| |
|---|
| DISTANCE |
| ALTITUDE |
| TURNING RADIUS |
| SPEED |

Figure 22:
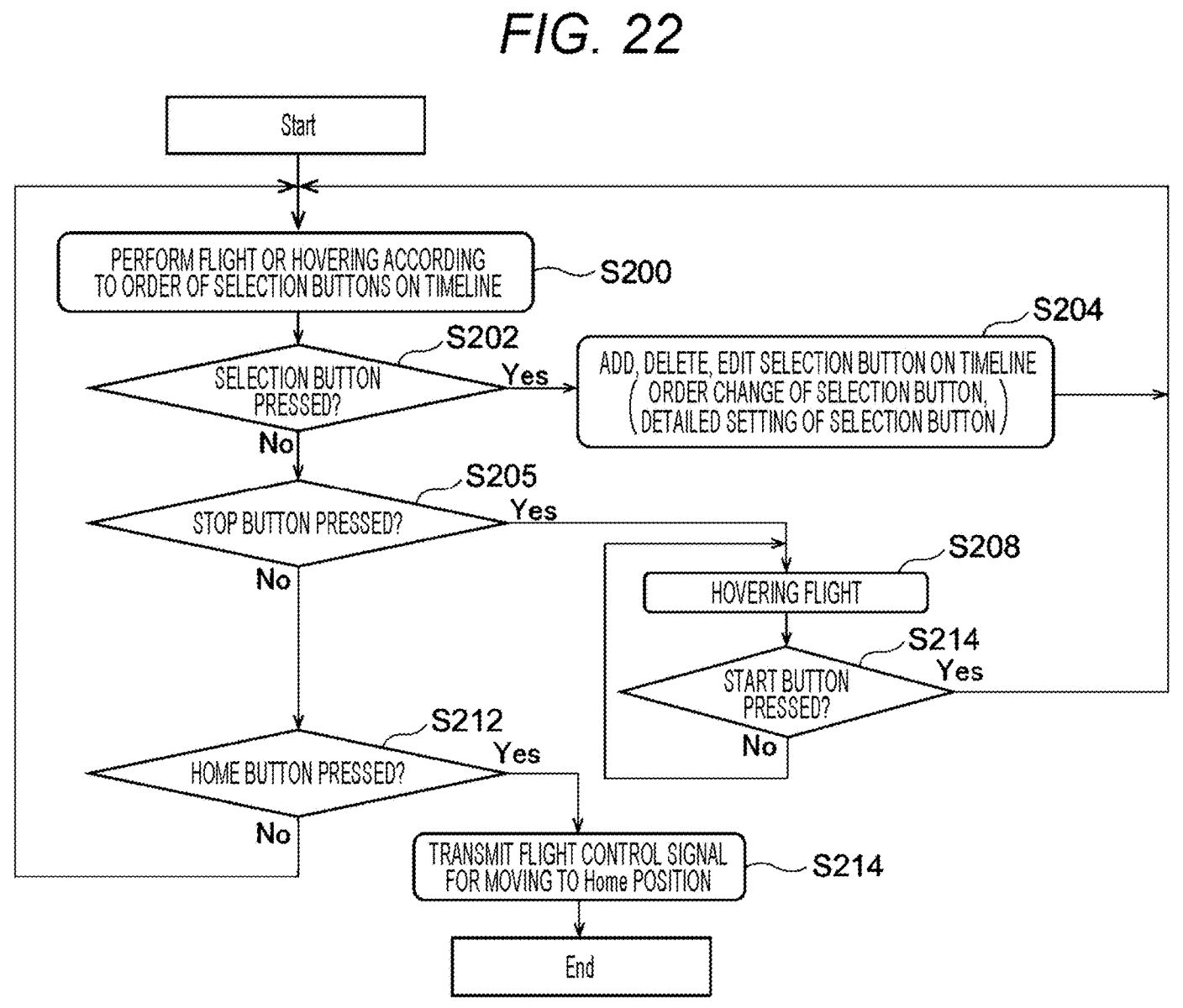

Start

↓

S200 — PERFORM FLIGHT OR HOVERING ACCORDING TO ORDER OF SELECTION BUTTONS ON TIMELINE

S202 — SELECTION BUTTON PRESSED?

Yes → S204 — ADD, DELETE, EDIT SELECTION BUTTON ON TIMELINE ( ORDER CHANGE OF SELECTION BUTTON, DETAILED SETTING OF SELECTION BUTTON )

No ↓

S205 — STOP BUTTON PRESSED?

Yes → S208 — HOVERING FLIGHT

↓

S214 — START BUTTON PRESSED?

Yes

No

No ↓

S212 — HOME BUTTON PRESSED?

Yes → S214 — TRANSMIT FLIGHT CONTROL SIGNAL FOR MOVING TO Home POSITION

↓

End

INFORMATION PROCESSING METHOD, INFORMATION PROCESSING DEVICE, COMPUTER-READABLE MEDIUM, AND IMAGING SYSTEM

CROSS-REFERENCE TO RELATED APPLICATIONS

The present application is based on PCT filing PCT/JP2022/006477, filed Feb. 17, 2022, which claims priority from Japanese Patent Application No. 2021-057347, filed Mar. 30, 2021, the entire contents of each are incorporated herein by reference.

TECHNICAL FIELD

The present disclosure relates to an information processing method, an information processing device, a computer-readable medium, and an imaging system.

BACKGROUND ART

A technique related to a photograph taking method in which a camera is attached to a wirelessly steerable flight vehicle and the camera takes a photograph is generally known. Attaching the camera to the flight vehicle makes it possible to take a photograph from the sky or from a place where a tripod cannot be erected.

CITATION LIST

Patent Document

Patent Document 1: Japanese Patent No. 6777121

SUMMARY OF THE INVENTION

Problems to be Solved by the Invention

However, since a user needs to perform flight operation of a flight vehicle and imaging operation of the camera, a degree of difficulty of the operation is high for a general camera user, and it is difficult to perform effective imaging according to a subject and a location.

Therefore, the present disclosure proposes an information processing method, an information processing device, a computer-readable medium, and an imaging system capable of generating a flight route of a flight vehicle by simple operation.

Solutions to Problems

In order to solve the problem described above, according to the present disclosure, there is provided an information processing method including:

a display control step of causing a display unit to display a plurality of template objects schematically illustrating flight patterns; and a control signal generation step of generating a control signal for a flight vehicle on the basis of flight control information including information on a flight route corresponding to a plurality of selected template objects selected from among the plurality of template objects.

The control signal generation step may include generating a control signal corresponding to the plurality of selected template objects in a predetermined order.

The control signal generation step may include generating the control signal corresponding to the plurality of selected template objects on the basis of a selection order from among the plurality of template objects displayed on the display unit.

The display control step may include displaying the selected template objects side by side in an order of selection in a predetermined area of the display unit.

The display control step may include changing and displaying an order of the plurality of selected template objects displayed side by side in the predetermined area according to a predetermined signal.

The display control step may include deleting any of the plurality of selected template objects displayed side by side in the predetermined area according to a predetermined signal.

The display control step may include adding a new selected template object to the plurality of selected template objects displayed side by side in the predetermined area according to a predetermined signal.

The display control step may include generating a flight route corresponding to each of the plurality of selected template objects displayed side by side in the predetermined area according to an arrangement order of the selected template objects, and causing the display unit to display the flight route.

The display control step may include causing the display unit to display an image line indicating a selected template object corresponding to a control signal being executed among the plurality of selected template objects displayed side by side in the predetermined area.

The display control step may include fixing the image line and changing positions of the plurality of selected template objects according to execution of the control signal.

The display control step may include changing a position of the image line according to execution of the control signal.

The display control step may include causing the display unit to display a captured image based on position information of the flight vehicle, and causing positions of the flight route and the captured image to correspond to each other.

The display control step may include causing the display unit to display a map based on position information of the flight vehicle, and causing positions of the flight route and the map to correspond to each other.

The flight control information may include at least any one of information of a distance, an altitude, a turning radius, and a speed.

According to the present disclosure, there is provided an information processing device including:

a display control unit that causes a display unit to display a plurality of template objects schematically illustrating flight patterns; and a control signal generation unit that generates a control signal for a flight vehicle on the basis of flight control information including information on the flight route corresponding to a plurality of selected template objects selected from among the plurality of template objects.

According to the present disclosure, there is provided an imaging system including:

a flight vehicle; and an information processing device that controls the flight vehicle, in which the information processing device includes a display control unit that causes a display unit to display a plurality of template objects schematically illustrating flight patterns, and a control signal generation unit that generates a control signal for the flight vehicle on the basis of flight control information including information on a flight route corresponding to a plurality of selected template objects selected from among the plurality of template objects.

According to the present disclosure, there is provided an imaging system including:

a flight vehicle;

a communication device that controls the flight vehicle; and an information processing device that controls the flight vehicle via the communication device, in which the information processing device includes a display control unit that causes a display unit to display a plurality of template objects schematically illustrating flight patterns, and a control signal generation unit that generates a control signal for the flight vehicle on the basis of flight control information including information on a flight route corresponding to a plurality of selected template objects selected from among the plurality of template objects.

According to the present disclosure, there is provided an imaging system including:

a flight vehicle; and an information processing device that controls the flight vehicle, in which the information processing device includes a display control unit that causes a display unit to display a plurality of template objects schematically illustrating flight patterns, a control signal generation unit that generates a control signal for the flight vehicle on the basis of flight control information including information on a flight route corresponding to a plurality of selected template objects selected from among the plurality of template objects, and a communication unit that communicates with the flight vehicle via a wireless base station.

According to the present disclosure, there is provided a program for causing a computer to execute:

a display control step of causing a display unit to display a plurality of template objects schematically illustrating flight patterns; and a control signal generation step of generating a control signal for a flight vehicle on the basis of flight control information including information on a flight route corresponding to a plurality of selected template objects selected from among the plurality of template objects.

According to the present disclosure, there is provided a computer-readable medium having recorded therein a program for causing a computer to execute:

a display control step of causing a display unit to display a plurality of template objects schematically illustrating flight patterns; and a control signal generation step of generating a control signal for a flight vehicle on the basis of flight control information including information on a flight route corresponding to a plurality of selected template objects selected from among the plurality of template objects.

BRIEF DESCRIPTION OF DRAWINGS

FIG. 2 is a block diagram illustrating a configuration example of an information processing terminal according to the present embodiment.

FIG. 4 is a block diagram illustrating a detailed configuration example of a flight route generation unit.

FIG. 5 is a diagram illustrating an example of a flight template.

FIG. 10 is a diagram schematically illustrating another example of selection processing of template objects by the selection unit.

FIG. 14 is a diagram schematically illustrating an example of another editing screen.

FIG. 22 is a flowchart illustrating an example of setting a route while the flight device is in flight.

FIG. 23 is a diagram illustrating a hardware configuration example of the information processing terminal.

MODE FOR CARRYING OUT THE INVENTION

Hereinafter, embodiments of an information processing method, an information processing device, a computer-readable medium, and an imaging system will be described with reference to the drawings. Hereinafter, main components of the information processing method, the information processing device, the computer-readable medium, and the imaging system will be mainly described, but the information processing device, the information processing method, the computer-readable medium, and the imaging system can include components and functions that are not illustrated or described. The following description does not exclude components and functions that are not illustrated or described.

First Embodiment

Figure 1:
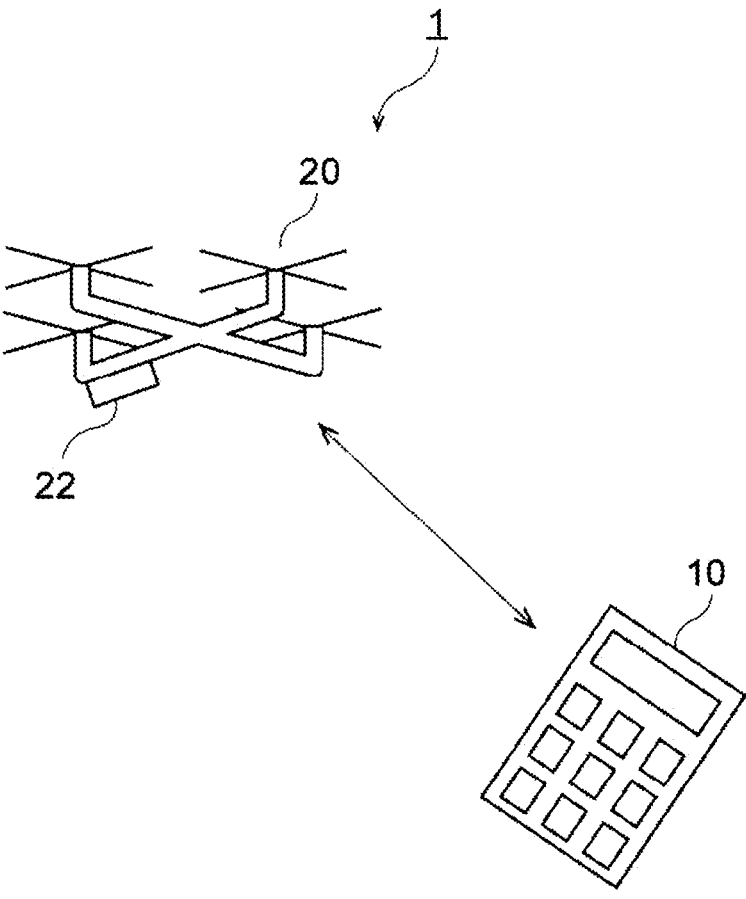
FIG. 1 is an explanatory diagram for explaining an outline of an imaging system according to the present embodiment.

FIG. 1 is an explanatory diagram for explaining an outline of an imaging system 1 according to the present embodiment. As illustrated in FIG. 1, the imaging system 1 includes an information processing terminal 10 and a flight device (flight vehicle) 20. The information processing terminal 10 and the flight device (flight vehicle) 20 are configured to be able to communicate with each other. The information processing terminal 10 is, for example, a device such as a smartphone, a tablet terminal, and the like, and is used as a device for creating flight route information of the flight device 20 in the imaging system according to the present embodiment. With the communication function, the information processing terminal 10 can transmit the created flight route information to the flight device 20.

On the other hand, the flight device 20 is a device that flies on the basis of the flight route information. The flight device 20 according to the present embodiment is provided with an imaging device 22. While flying on the basis of the flight route information, the flight device 20 performs imaging by the imaging device 22 on the basis of a camera angle and framing set together with the flight route information.

In the imaging system 1 according to the present embodiment, the flight device 20 flies and captures an image on the basis of the flight route information created by the information processing terminal 10. The flight route information of the flight device 20 is selected from a plurality of templates of flight patterns presented to a user via the information processing terminal 10. Then, the information processing terminal 10 can generate a flight route by a combination of the plurality of selected templates. Note that the template of the flight pattern may also include settings at the time of imaging by the imaging device 22. Therefore, by selecting a template for a subject by the user, flight route information including flight control information for causing the flight device 20 to fly along the flight route and imaging control information of the imaging device 22 is automatically generated.

In the present embodiment, the flight route means a route from takeoff to landing or a route from an arbitrary start point to an arbitrary end point. Furthermore, there is a case where a flight route defined in the template is referred to as a flight pattern. That is, the flight route is formed by a set of flight patterns.

Hereinafter, a configuration of the imaging system and processing of generating the flight route information of the flight device 20 according to the present embodiment will be described in detail.

Figure 2:
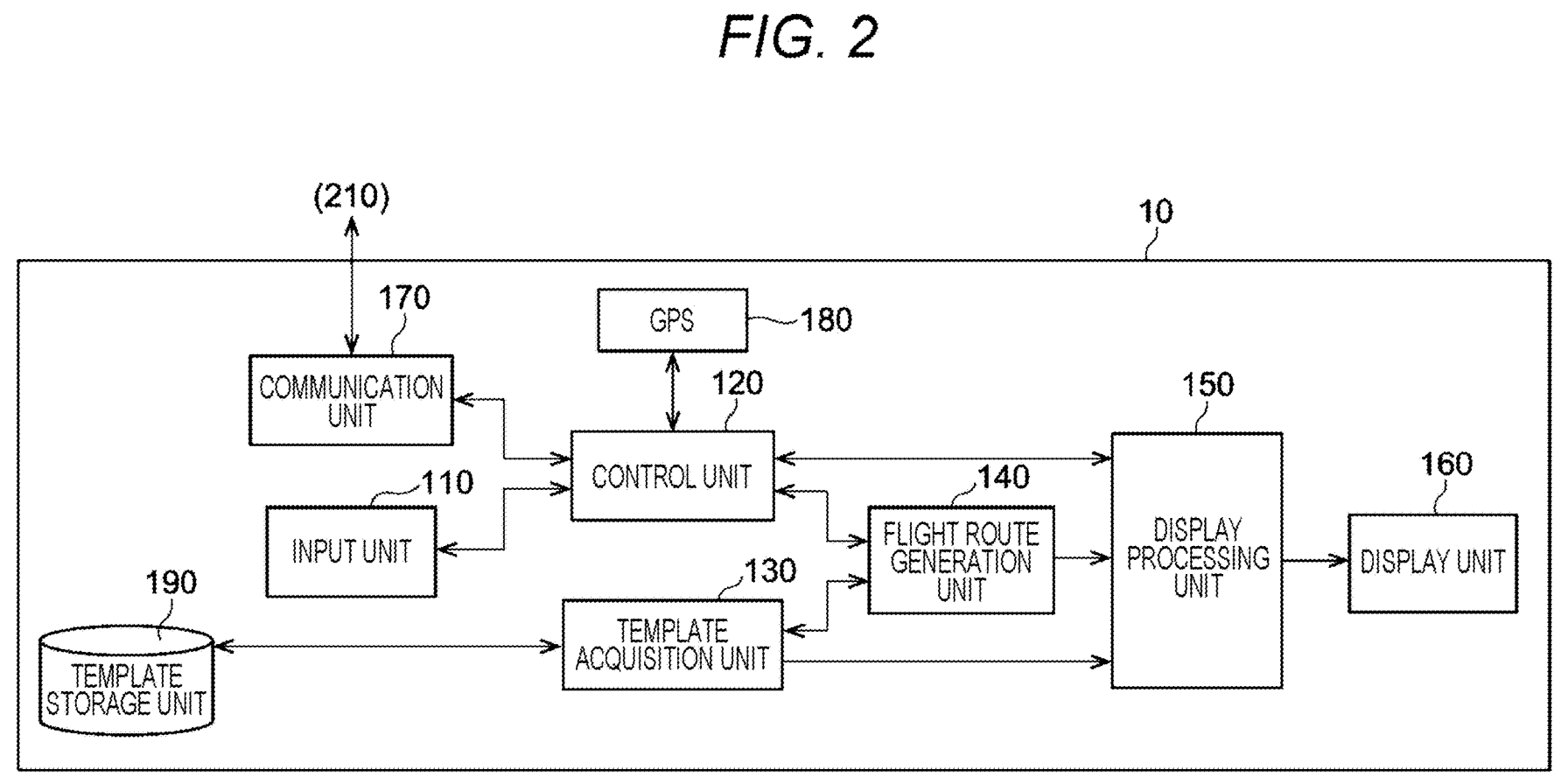

FIG. 2 is a block diagram illustrating a configuration example of the information processing terminal 10 according to the present embodiment. As illustrated in FIG. 2, the information processing terminal 10 includes an input unit 110, a control unit 120, a template acquisition unit 130, a flight route generation unit 140, a display processing unit 150, a display unit 160, a communication unit 170, a global positioning system (GPS) 180, and a template storage unit 190. Note that the information processing terminal 10 according to the present embodiment corresponds to an information processing device. The information processing terminal 10 includes a central processing unit (CPU), and configures each unit by executing a program stored in the template storage unit 190.

The input unit 110 is a functional unit that receives operation of the information processing terminal 10 from a user. The input unit 110 is, for example, a touch panel provided to overlap the display unit 160, a button provided on a housing of the information processing terminal 10, and the like. When receiving an operation input from the user, the input unit 110 outputs input information to the control unit 120.

The control unit 120 controls various functional units included in the information processing terminal 10 on the basis of the input information from the input unit 110. For example, upon receiving a request to create flight route information as the input information, the control unit 120 instructs the flight route generation unit 140 to display a template setting screen for setting the flight route information (see FIGS. 8 and 20 as described later) on the display unit 160 via the display processing unit 150.

Furthermore, when receiving change information for changing flight route information of a selected template as the input information, the control unit 120 instructs the flight route generation unit 140 to modify the flight route information. Furthermore, the control unit 120 also performs communication control with the flight device 20.

The template acquisition unit 130 acquires a template of flight route information of the flight device 20 set in advance from the template storage unit 190 on the basis of an instruction from the control unit 120. Then, the template acquisition unit 130 supplies the acquired template to the flight route generation unit 140.

The flight route generation unit 140 generates flight route information on the basis of a combination of templates selected by the user. Furthermore, the flight route generation unit 140 receives change information of flight route information and modifies the flight route information. Furthermore, the flight route generation unit 140 outputs the generated flight route information to the display unit 160 via the display processing unit 150. Note that details of a function of the flight route generation unit 140 will be described later.

The display processing unit 150 performs processing of displaying various information on the display unit 160. The display processing unit 150 causes the display unit 160 to display, for example, the plurality of templates acquired by the template acquisition unit 130, the flight route information generated by the flight route generation unit 140, and the like.

The display unit 160 displays various information subjected to the display processing by the display processing unit 150. The display unit 160 is, for example, a liquid crystal display device, an organic EL display device, and the like. When the display unit 160 is provided with a touch panel as the input unit 110, the user can directly operate information displayed on the display unit 160 by bringing a finger and the like into contact with a surface of the display unit 160.

The communication unit 170 is a functional unit for transmitting and receiving information to and from the flight device 20. The communication unit 170 may be, for example, a device for wireless communication such as Bluetooth (registered trademark), a wireless local area network (LAN), and the like or may be a wire communication device that performs communication by wire. Alternatively, the communication unit 170 may be a device for wireless communication such as a global system for mobile communications (GSM), a wideband code division multiple access (LTE), or a low power wide area-network (LPWA). The communication unit 170 transmits information to the flight device 20 in response to a transmission instruction from the control unit 120, and outputs information received from the flight device 20 to the control unit 120.

The global positioning system (GPS) 180 receives signals from several satellites in the sky through a GPS receiver, and acquires a current position of the information processing terminal 10. The GPS 180 supplies the current position to the control unit 120.

The template storage unit 190 stores a plurality of pieces of flight pattern template information. Furthermore, the template storage unit 190 stores map data.

Figure 3:
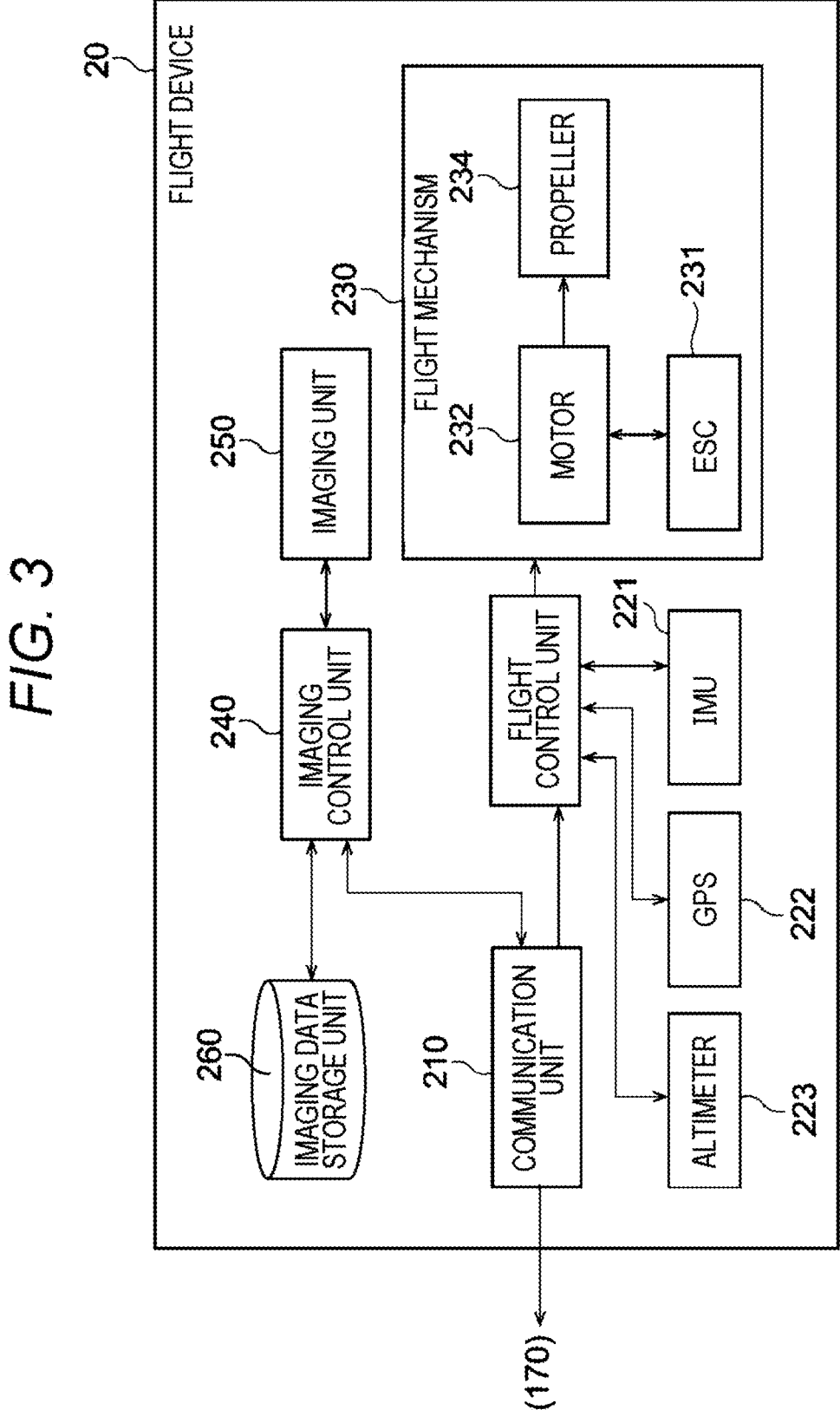
FIG. 3 is a block diagram illustrating a configuration example of a flight device.

FIG. 3 is a block diagram illustrating a configuration example of the flight device 20. As illustrated in FIG. 3, the flight device 20 includes a communication unit 210, a flight control unit 220, an IMU 221, a GPS 222, an altimeter 223, a flight mechanism 230, an imaging control unit 240, an imaging unit 250, and an imaging data storage unit 260.

The communication unit 210 is a functional unit for transmitting and receiving information to and from the information processing terminal 10. The communication unit 210 is equivalent to the communication unit 170 of the information processing terminal 10, and is, for example, a device for wireless communication such as Bluetooth (registered trademark), a wireless LAN, and the like, a wire communication device that performs communication by wire, and the like. The communication unit 210 outputs information received from the information processing terminal 10 to the flight control unit 220 and the imaging control unit 240, receives a transmission instruction from the imaging control unit 240, and transmits position information by the GPS 222 and information including a captured image to the information processing terminal 10.

The flight control unit 220 performs flight control to cause the flight device 20 to fly along a set flight route on the basis of flight route information, information from the IMU 221, and information from the GPS 222 and the altimeter 223. That is, the flight control unit 220 drives the flight mechanism 230 and causes the flight device 20 to fly on the basis of a flight control signal including the flight route information.

An inertial measurement unit (IMU) 221 detects three-dimensional inertial motion (orthogonal three-axis translational motion and rotational motion) of the flight device 20. For example, the IMU 221 detects a translational motion by an acceleration sensor [m/s2] and a rotational motion by an angular velocity (gyro) sensor [deg/sec], and supplies the translational motion and the rotational motion to the flight control unit 220.

The global positioning system (GPS) 222 acquires a current position of the flight device 20 and supplies the current position to the flight control unit 220. The altimeter 223 acquires a current altitude of the flight device 20 and supplies the current altitude to the flight control unit 220. As described above, the flight control unit 220 controls the flight device 20 on the basis of the flight route information, the information from the IMU 221, and the information from the GPS 222 and the altimeter 223.

The flight mechanism 230 is a mechanism for flying the flight device 20, and rotates a propeller 234 by a motor 232 to generate lift to fly the flight device 20. The flight mechanism 230 includes, for example, four propellers 234, four motors 232 provided for the respective propellers 234, and an electric speed controller (ESC) 231. Each motor 232 is driven on the basis of motor drive control information from the flight control unit 220, and a rotation speed is controlled by the ESC 231. The propeller 234 is rotated by a rotational force of each motor 232.

The imaging control unit 240 controls imaging by the imaging unit 250 on the basis of setting information at the time of imaging by the imaging unit 250 (hereinafter also referred to as "imaging setting information") included in the flight route information. For example, the imaging control unit 240 instructs the imaging unit 250 to start or end imaging or sets a camera angle, framing, and the like on the basis of the imaging setting information. Furthermore, the imaging control unit 240 stores imaging data acquired by the imaging unit 250 in the imaging data storage unit 260 or transmits the imaging data to the information processing terminal 10 via the communication unit 210.

The imaging unit 250 captures a still image or a moving image. The imaging unit 250 includes, for example, an imaging element and the like such as a lens, a charge coupled device (CCD) image sensor, a complementary metal oxide semiconductor (CMOS) image sensor, and the like. The imaging unit 250 captures a still image or a moving image on the basis of imaging control information from the imaging control unit 240. The captured image may be recorded in the imaging data storage unit 260 as the imaging data.

The imaging data storage unit 260 stores imaging data including a still image or a moving image acquired by the imaging unit 250. The imaging data may be stored in the imaging data storage unit 260 in association with flight route information when an image is captured. The imaging data stored in the imaging data storage unit 260 can be read by the information processing terminal 10 or another device after flight, for example. The imaging control unit 240, the imaging unit 250, and the imaging data storage unit 260 constitute the imaging device 22.

FIG. 4 is a block diagram illustrating a detailed configuration example of the flight route generation unit 140. The flight route generation unit 140 includes a display control unit 140a, a selection unit 140b, a control signal generation unit 140c, and an editing unit 140d.

First, a flight template will be described with reference to FIGS. 5 to 7. FIG. 5 is a diagram illustrating an example of a flight template 50. As illustrated in FIG. 5, the flight template 50 includes a template object 52 and flight control information 54 associated with the template object 52. This information of the flight template 50 is stored in the template storage unit 190 as described above.

In the present embodiment, the template object 52 is a diagram schematically illustrating flight route information. That is, it is a drawing that can conceptually recall a traveling state of the flight device 20 based on the flight control information 54. This template object 52 is displayed as an image on the display unit 160 by the display processing unit 150. Therefore, the user can recall the traveling state of the flight device 20 by a screen based on the template object 52. In this manner, the template object 52 schematically illustrating the flight route information is displayed on the display unit 160. Note that, in the present embodiment, there is a case where the template object 52 is referred to as a selection button.

Information necessary for controlling the flight device 20 is set in the flight control information 54. For example, information on a distance, an altitude, a turning radius, and a speed is set in the flight control information 54. As described above, the flight template 50 includes display data of the template object 52 and the flight control information 54. Note that the flight control information 54 may include three-dimensional position information or a vector component of the flight device 20. Alternatively, the flight control information 54 may be configured by a trajectory at a coordinate position on world coordinates or local coordinates.

Figure 6:
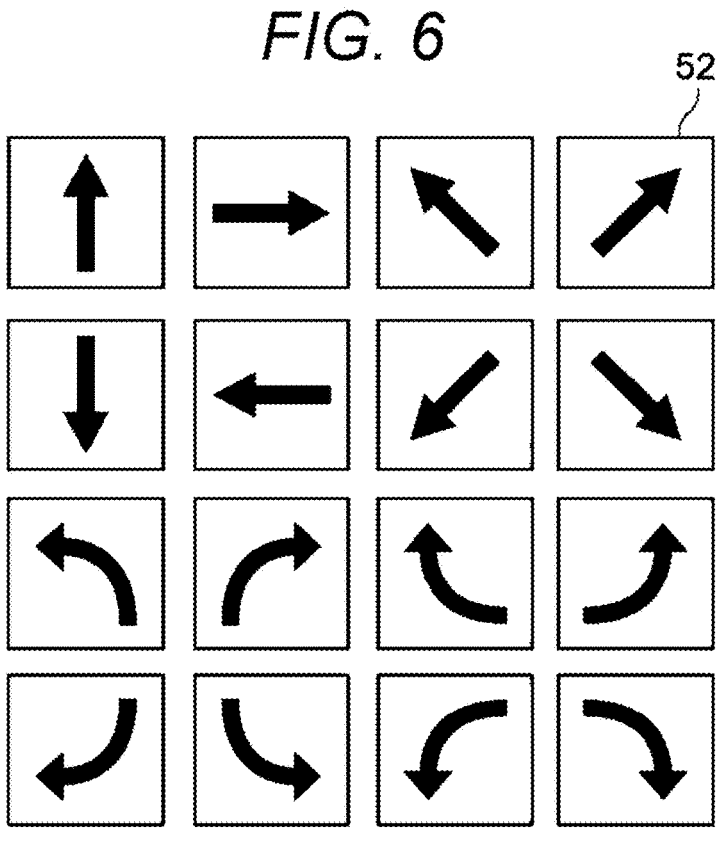
FIG. 6 is a diagram illustrating an example of a plurality of template objects.
Figure 7:
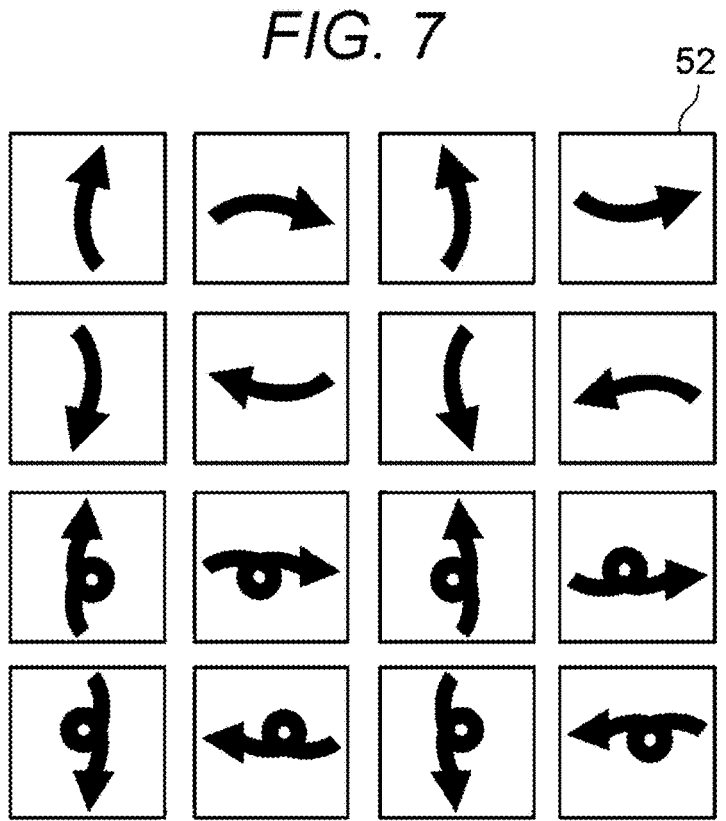
FIG. 7 is a diagram illustrating an example of a plurality of other template objects.

FIG. 6 is a diagram illustrating an example of a plurality of template objects 52. FIG. 7 is a diagram illustrating an example of a plurality of other template objects 52. As illustrated in FIGS. 6 and 7, each template includes the template object (selection button) 52 and the flight control information 54 associated with the template object 52.

Figure 8:
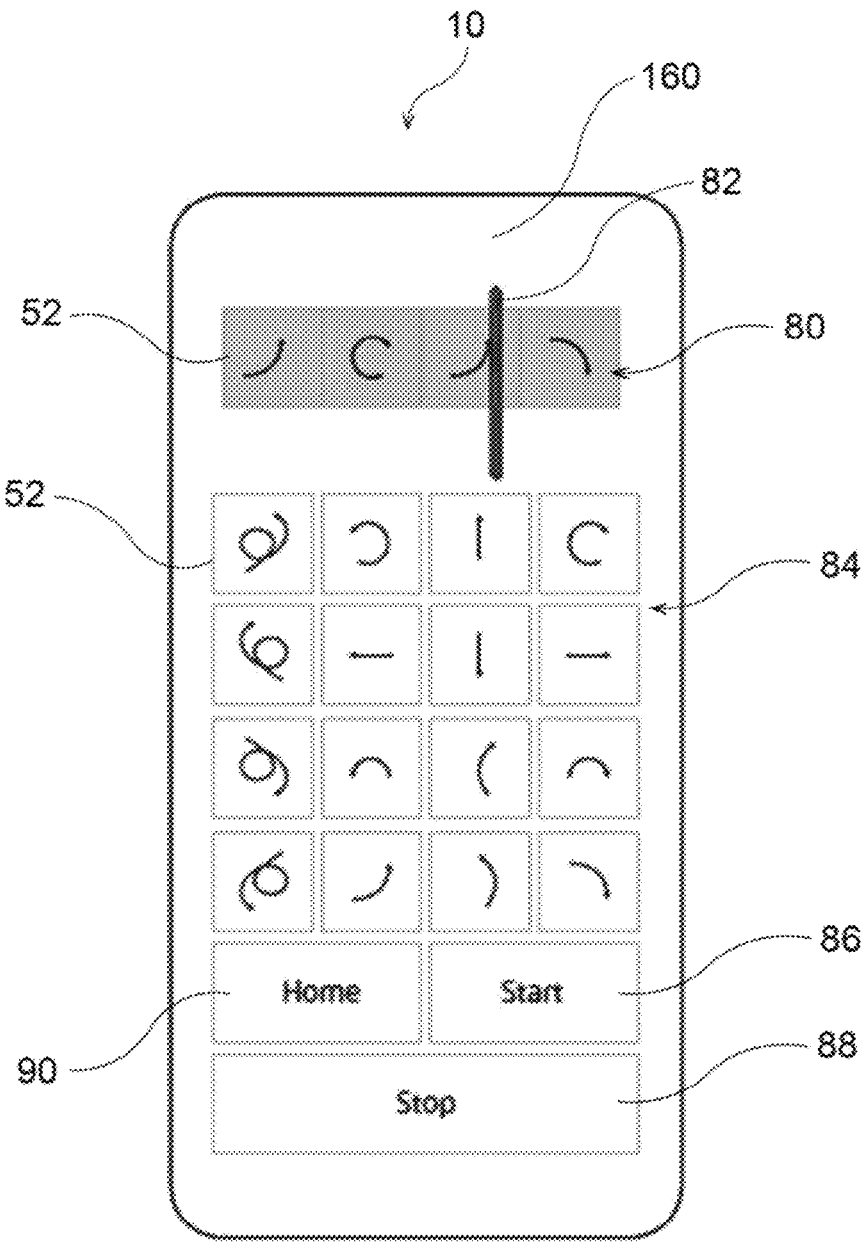
FIG. 8 is a diagram illustrating an example of a setting screen of template objects displayed by a display control unit.

FIG. 8 is a diagram illustrating an example of a setting screen of the template objects 52 displayed by the display control unit 140a. Upon receiving a request to create flight route information as input information, the control unit 120 instructs the display control unit 140a to display a setting screen of the flight template 50 for setting flight route information on the display unit 160 via the display processing unit 150. Note that, in a case where the information processing terminal 10 is, for example, a device such as a smartphone, a tablet terminal, and the like, the template setting screen is displayed on the display unit 160 when the user instructs an icon or the like indicating the flight device 20 by the input unit 110. That is, the user's instruction on the icon indicating the flight device 20, for example, a touch, is an input instruction to the request to create the flight route information.

A timeline image area 80 is an area in which the template object 52 selected from an image area 84 is displayed. Note that the template object 52 in the timeline image area 80 according to the present embodiment corresponds to a selected template object.

An image line 82 is a line indicating an execution state of the timeline image area 80. That is, this image line 82 is an image indicating an ongoing processing position of the template object 52 in the timeline image area 80.

The image area 84 is an image area indicating the selectable template object 52. For example, images in FIGS. 6, 7, and the like can be sequentially displayed in the image area 84. For example, when a screen of the display unit 160 is flicked by the user's finger, the display control unit 140a changes the image area 84 to the images in FIGS. 6, 7, and the like. Therefore, more template objects 52 can be displayed on the display unit 160.

Figure 9:
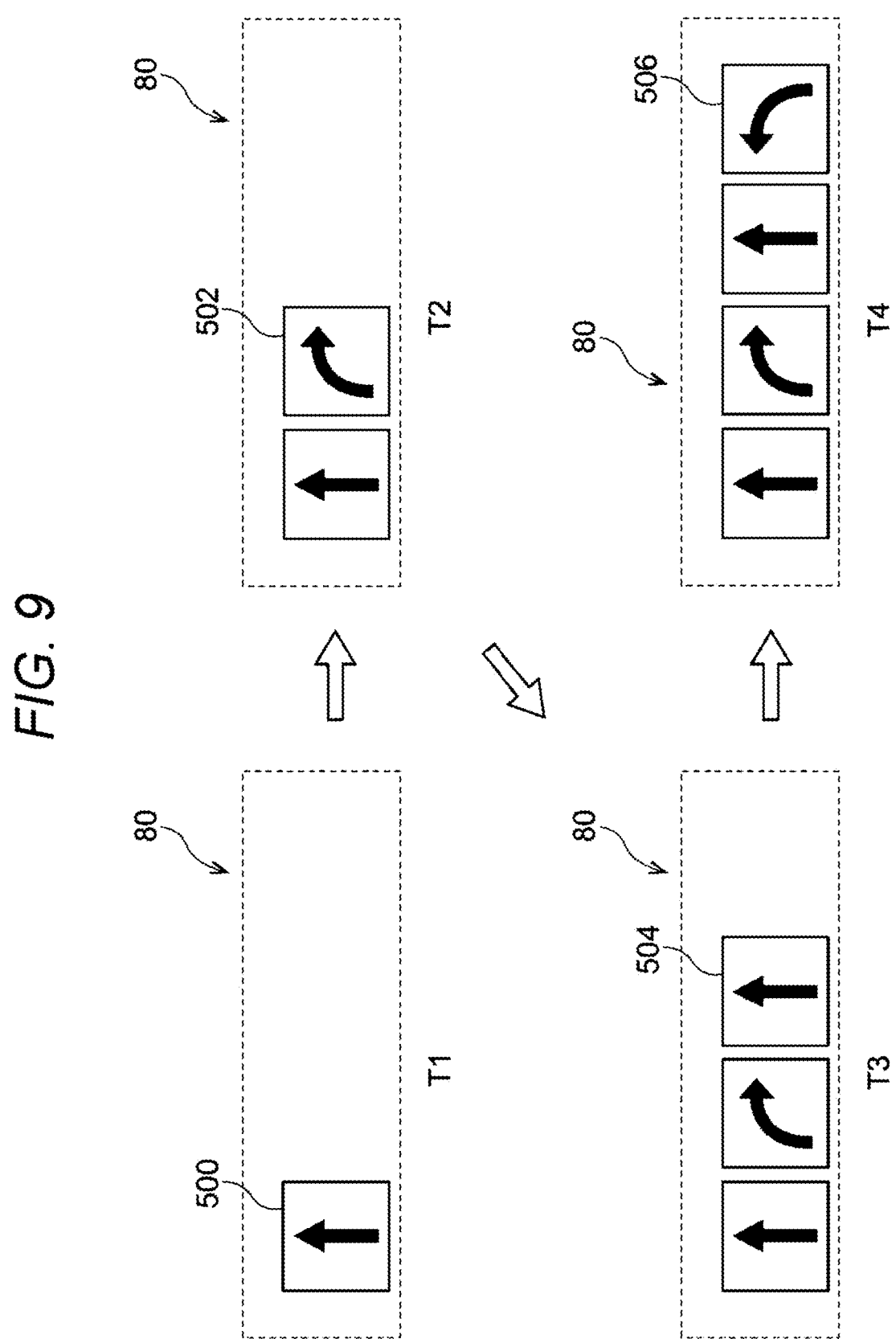
FIG. 9 is a diagram schematically illustrating an example of selection processing of template objects by a selection unit.

A processing example of the selection unit 140b will be described with reference to FIGS. 9 to 11. FIG. 9 is a diagram schematically illustrating an example of selection processing of the template objects 52 by the selection unit 140b. FIG. 9 illustrates an example in which template objects 500, 502, 504, and 506 sequentially selected from the image area 84 (see FIG. 8) by the selection processing by the selection unit 140b are set in the timeline image area 80 in an order of time series T1, T2, T3, and T4.

As illustrated in FIG. 9, when receiving a request to create flight route information as input information, the selection unit 140b sequentially sets, in the timeline image area 80, the template objects 500, 502, 504, and 506 sequentially instructed by the user in the image area 84 (see FIG. 8). For example, in a case where the input unit 110 is a touch panel provided to overlap the display unit 160, the selection unit 140b selects the template objects 500, 502, 504, and 506 at positions touched by the user's finger in a touched order, and sets the template objects in the timeline image area 80.

Figure 10:
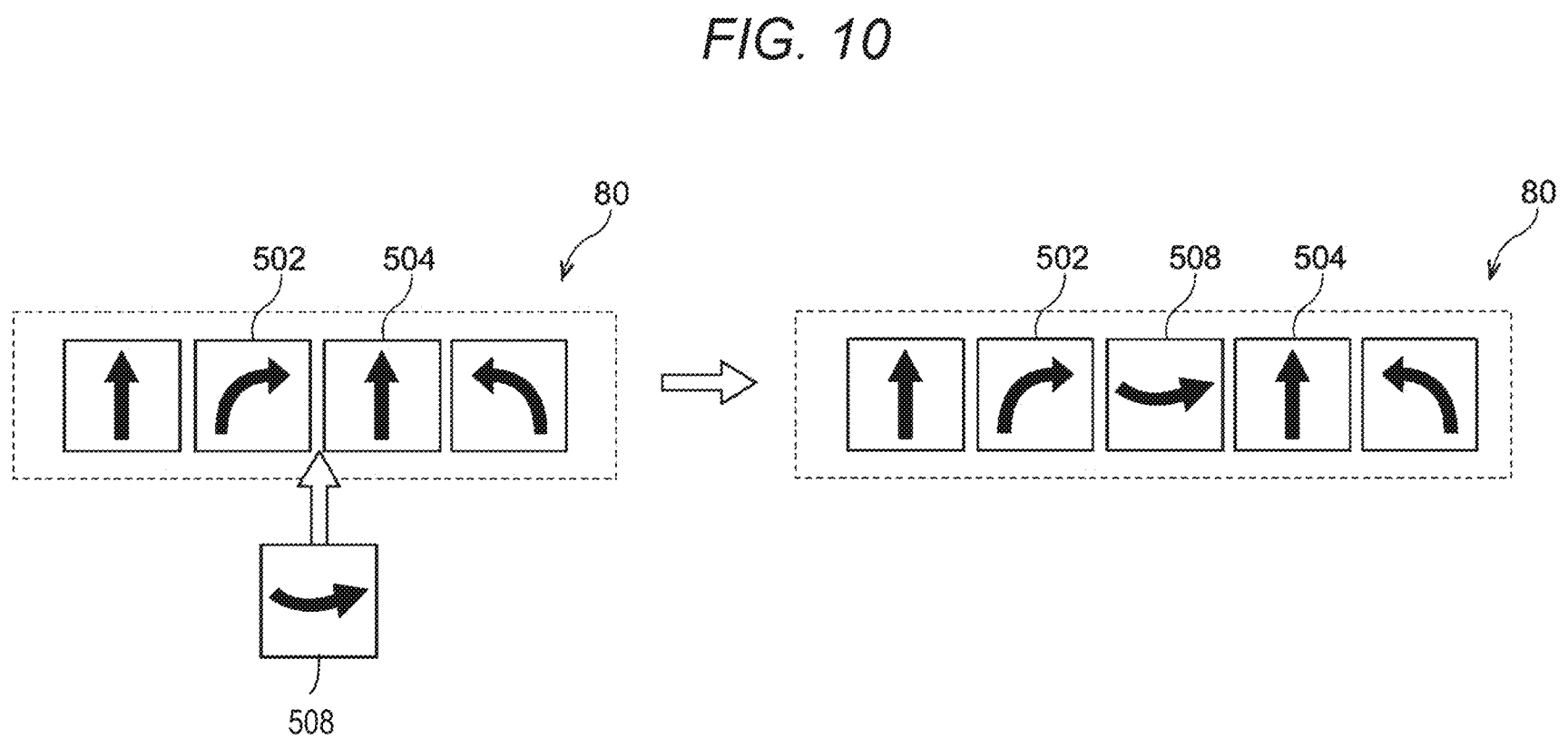

FIG. 10 is a diagram schematically illustrating another example of selection processing of the template objects 52 by the selection unit 140b. FIG. 10 illustrates an example in which the selection unit 140b puts a selected template object 508 between a template object 502 and a template object 504. For example, in a case where the screen of the display unit 160 is a touch panel, the selection unit 140b can set the template object 508 by maintaining a touched state of the template object 508 at a touched position and shifting it to the inside of the timeline image area 80.

Figure 11:
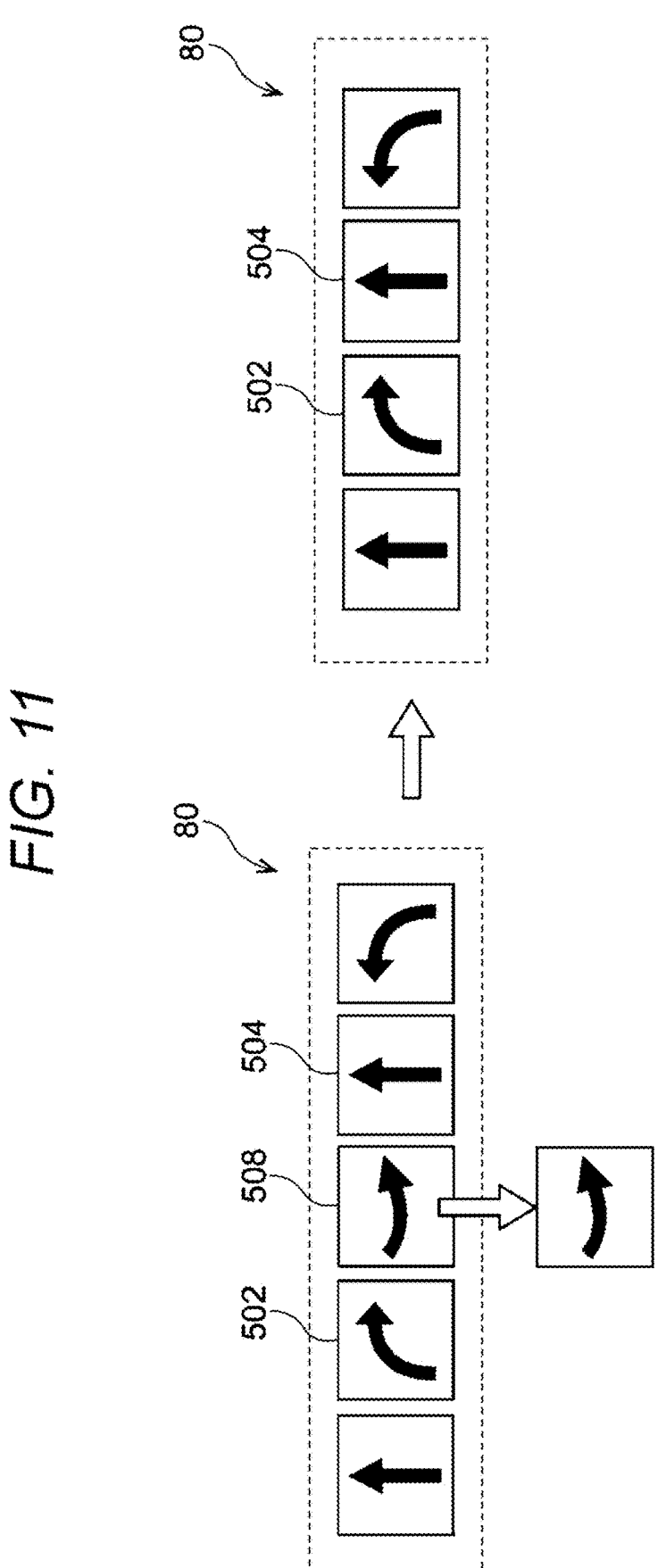
FIG. 11 is a diagram schematically illustrating an example of processing of eliminating a template object by the selection unit.

FIG. 11 is a diagram schematically illustrating an example of processing of eliminating the template object 508 by the selection unit 140b. FIG. 11 illustrates an example in which the selection unit 140b eliminates the selected template object 508 from between the template object 502 and the template object 504. For example, in a case where the screen of the display unit 160 is a touch panel, the selection unit 140b can eliminate the template object 508 by maintaining a touched state of the template object 508 at a touched position and shifting it to the outside of the timeline image area 80.

Figure 12A:
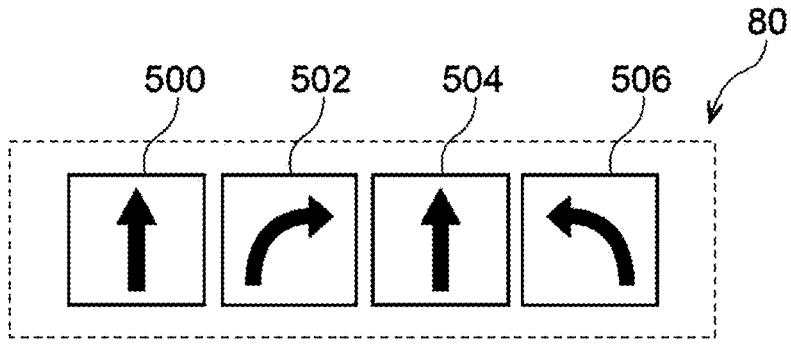
FIG. 12A is a diagram schematically illustrating template objects set in a timeline image area.

FIG. 12A is a diagram schematically illustrating the template objects 500, 502, 504, and 506 set in the timeline image area 80.

As illustrated in FIG. 12A, when a Start button 86 (see FIG. 8) is instructed by the user, the control signal generation unit 140c generates a control signal including flight route information according to the template objects 500, 502, 504, and 506 set in the timeline image area 80. More specifically, the control signal generation unit 140c sequentially generates a time-series control signal including the flight control information 54 (see FIG. 5) associated with the template objects 500, 502, 504, and 506 according to a timeline of the template objects 500, 502, 504, and 506. The time-series control signal is transmitted to the flight device 20 via the control unit 120 and the communication unit 170.

Figure 12B:
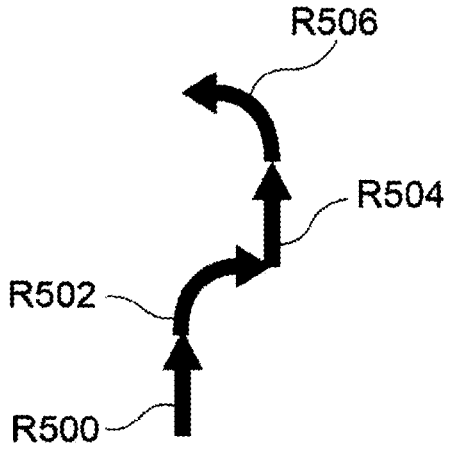
FIG. 12B is a diagram schematically illustrating an example of a flight route on which the flight device flies.

FIG. 12B is a diagram schematically illustrating an example of flight routes R500, R502, R504, and R506 along which the flight device 20 flies in accordance with the template objects 500, 502, 504, and 506. As illustrated in FIG. 12B, the flight device 20 flies along the flight route R500 on the basis of the control signal including the flight control information 54 (see FIG. 5) associated with the template object 500. In a case where home coordinates are set, the home coordinates become a start point of the flight route R500. On the other hand, in a case where the home coordinates are not set, coordinates of a current value indicated by the GPS 180 (see FIG. 2) become the start point.

Subsequently, the flight device 20 flies along the flight route R502 on the basis of the control signal including the flight control information 54 (see FIG. 5) associated with the template object 502. A start point of the flight route R502 is an end point of the flight route R500. Similarly, the flight device 20 flies along the flight route R504 on the basis of the control signal including the flight control information 54 (see FIG. 5) associated with the template object 504. A start point of the flight route R504 is an end point of the flight route R502. Similarly, the flight device 20 flies along the flight route R506 on the basis of the control signal including the flight control information 54 (see FIG. 5) associated with a template object 506. A start point of the flight route R506 is an end point of the flight route R504.

As can be seen from these, the template objects 500, 502, 504, and 506 arranged in time series can make the user image a flight line of the flight device 20. Therefore, it is possible to more easily generate the flight route information of the flight device 20 along the flight image of the user only by arranging the template objects 500, 502, 504, and 506 on the screen of the display unit 160 in the information processing terminal 10.

As illustrated in FIG. 8 again, when a Stop button 88 is instructed by the user, the control signal generation unit 140c generates a stop control signal for stopping flight of the flight device 20 and hovering. This stop control signal is transmitted to the flight device 20 via the control unit 120 and the communication unit 170. Therefore, the flight device 20 starts hovering.

When a Home button 90 is instructed by the user, the control signal generation unit 140c generates a return control signal for returning the flight of the flight device 20 to coordinates set in advance as a home. This return control signal is transmitted to the flight device 20 via the control unit 120 and the communication unit 170. Therefore, the flight device 20 returns to the coordinates set in advance as the home. In a case where the coordinates are not set in advance as the home, the control signal generation unit 140c generates a return control signal for returning the flight device to coordinates output from the GPS 180 (see FIG. 2) as the home.

Referring to FIG. 4 again, editing processing of the editing unit 140d will be described with reference to FIGS. 13 to 15. This editing unit 140d edits setting information of the flight template 50 (see FIG. 5).

Figure 13:
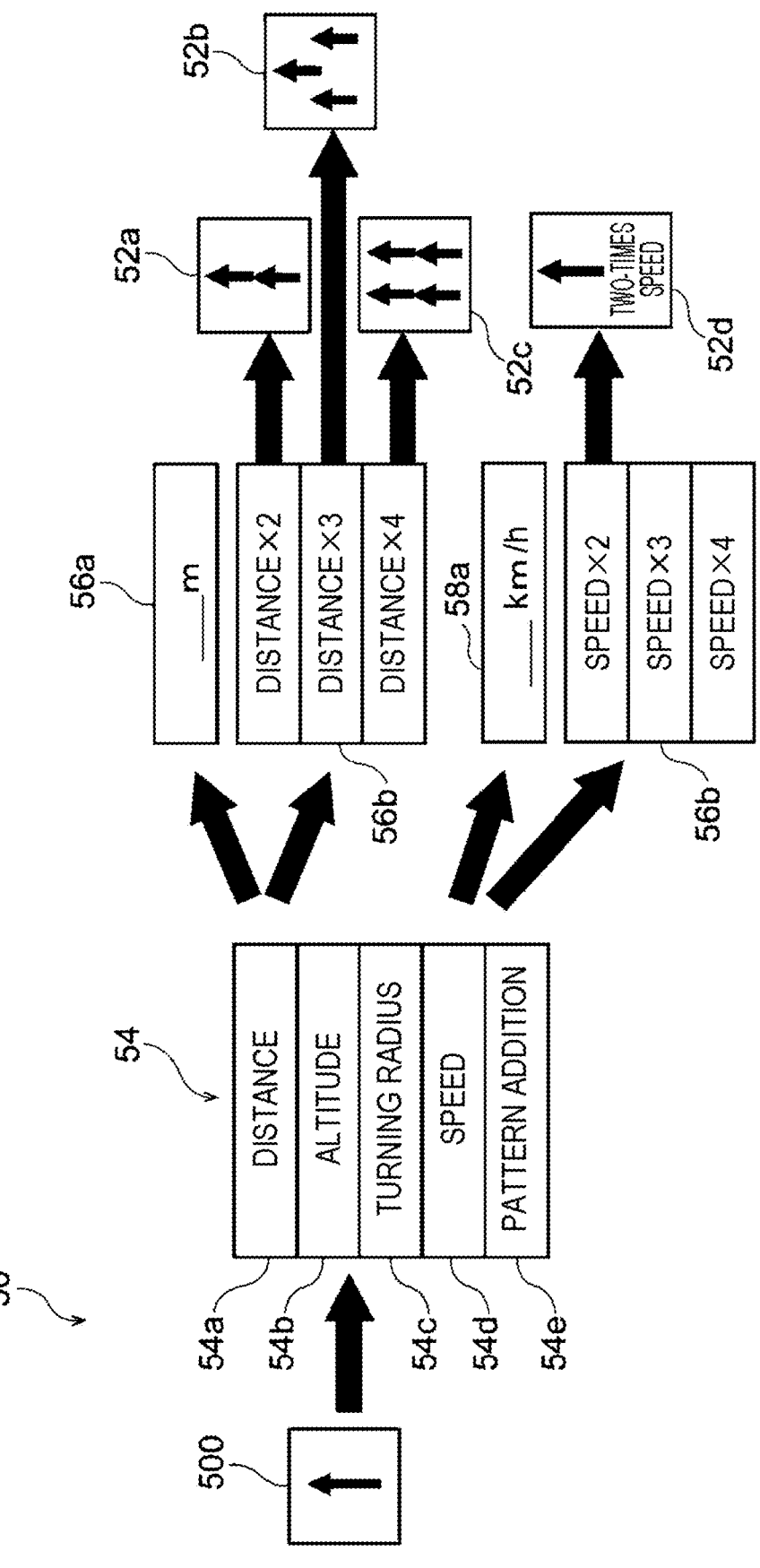
FIG. 13 is a diagram schematically illustrating an example of an editing screen displayed by an editing unit via the display control unit.

FIG. 13 is a diagram schematically illustrating an example of an editing screen displayed by the editing unit 140d via the display control unit 140a. For example, when the user presses the template object 500 for a long time, the control unit 120 determines that an editing instruction has been input, and causes the editing unit 140d to display an editing screen 54 of the template object 500.

Buttons 54a to 54e corresponding to setting information are displayed on the editing screen 54. Subsequently, when the user selects, for example, presses one of the buttons 54a to 54e, setting screens 56a, 56b, 58a, and 58b corresponding to the buttons 54a to 54d are displayed.

For example, when the button 54a corresponding to a distance is instructed, distance setting screens 56a and 56b are displayed. When the user selects the setting screen 56a, a number is input as the distance via the input unit 110. On the other hand, when the user selects one of the setting screens 56b, a distance corresponding to a selected position is set.

For example, when the button 54d corresponding to a speed is instructed, speed setting screens 58a and 58b are displayed. When the user selects the setting screen 58a, a number is input as the speed via the input unit 110. On the other hand, when the user selects one of the setting screens 58b, a speed corresponding to a selected position is set. When any of the buttons 54a to 54e is instructed in this manner, the display screen is displayed hierarchically, and the setting information can be edited. At this time, template objects 52a to 52d are also changed according to the setting information. When the button 54e is pressed, the edited flight template 50 is stored in the template storage unit 190 (see FIG. 2) as a template having the template objects 52a to 52d and the corresponding flight information. Furthermore, the template objects 52a to 52d are added to the image area 84 (see FIG. 8). In this manner, the user can add a new template to the image area 84 (see FIG. 8) only by instructing a position in the screen of the display unit 160. Furthermore, since the number of arrows in the template objects 52a to 52c is X (X is a natural number of 2 or more) times, the user can easily image length of a flight route. Furthermore, since information such as "×2" is written in the template object 52d, the user can easily image the speed of the flight device 20.

Figure 14:
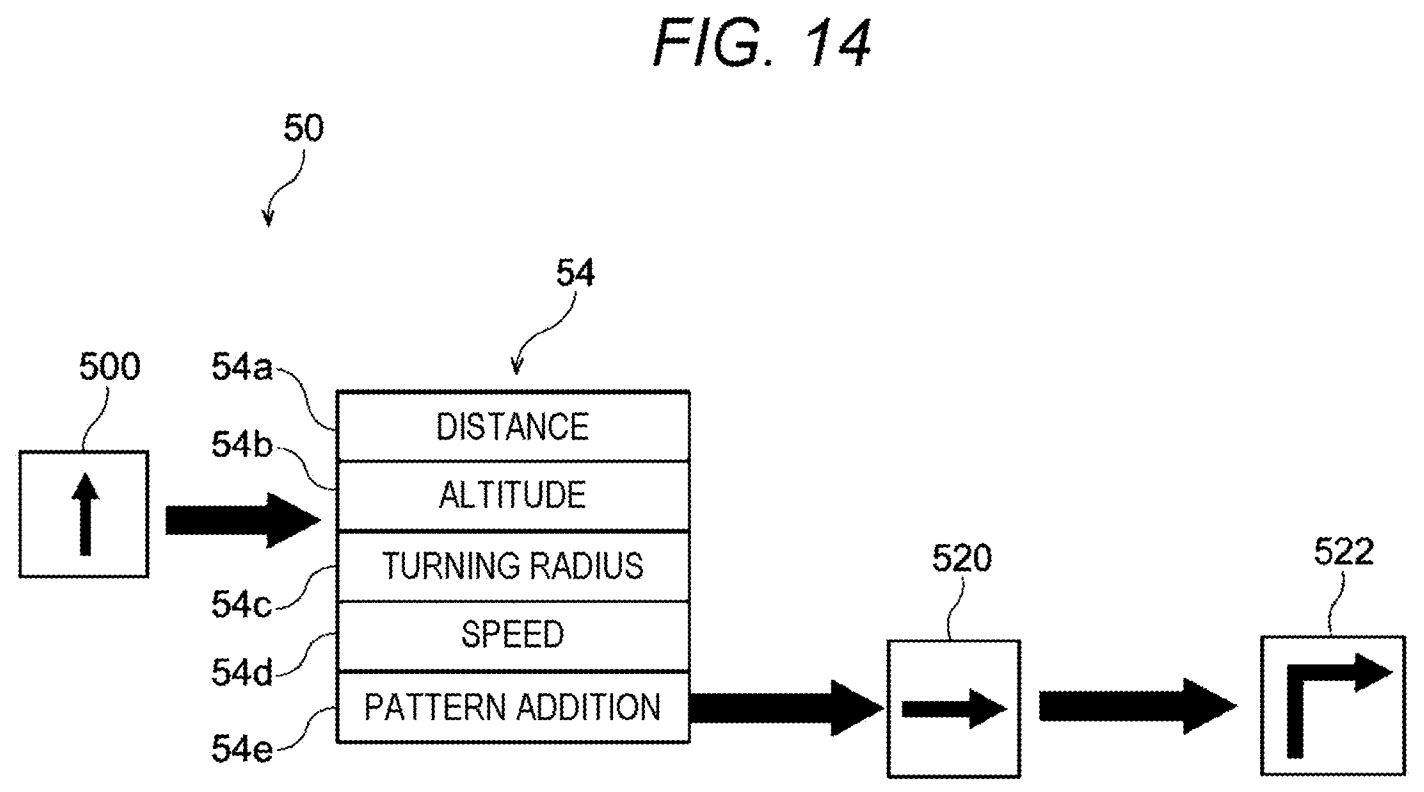

FIG. 14 is a diagram schematically illustrating an example of another editing screen displayed by the editing unit 140d via the display control unit 140a. For example, when the user presses a template object 500 for a long time, the control unit 120 determines that an editing instruction has been input, and causes the editing unit 140d to display an editing screen 54 of a template object 500. Next, when the button 54e is pressed and the user further presses the template object 500 for a long time, the editing unit 140d generates a template object 502 and adds the template object to the image area 84 (see FIG. 8). Setting information corresponding to the template object 500 and setting information corresponding to the template object 500 are associated with the template object 502. Furthermore, a template corresponding to the template object 502 is stored in the template storage unit 190 (see FIG. 2). Therefore, when template object 502 is selected in the timeline image area 80, a control signal based on setting information of the template object 502 is generated following a control signal based on the setting information of the template object 500.

Figure 15:
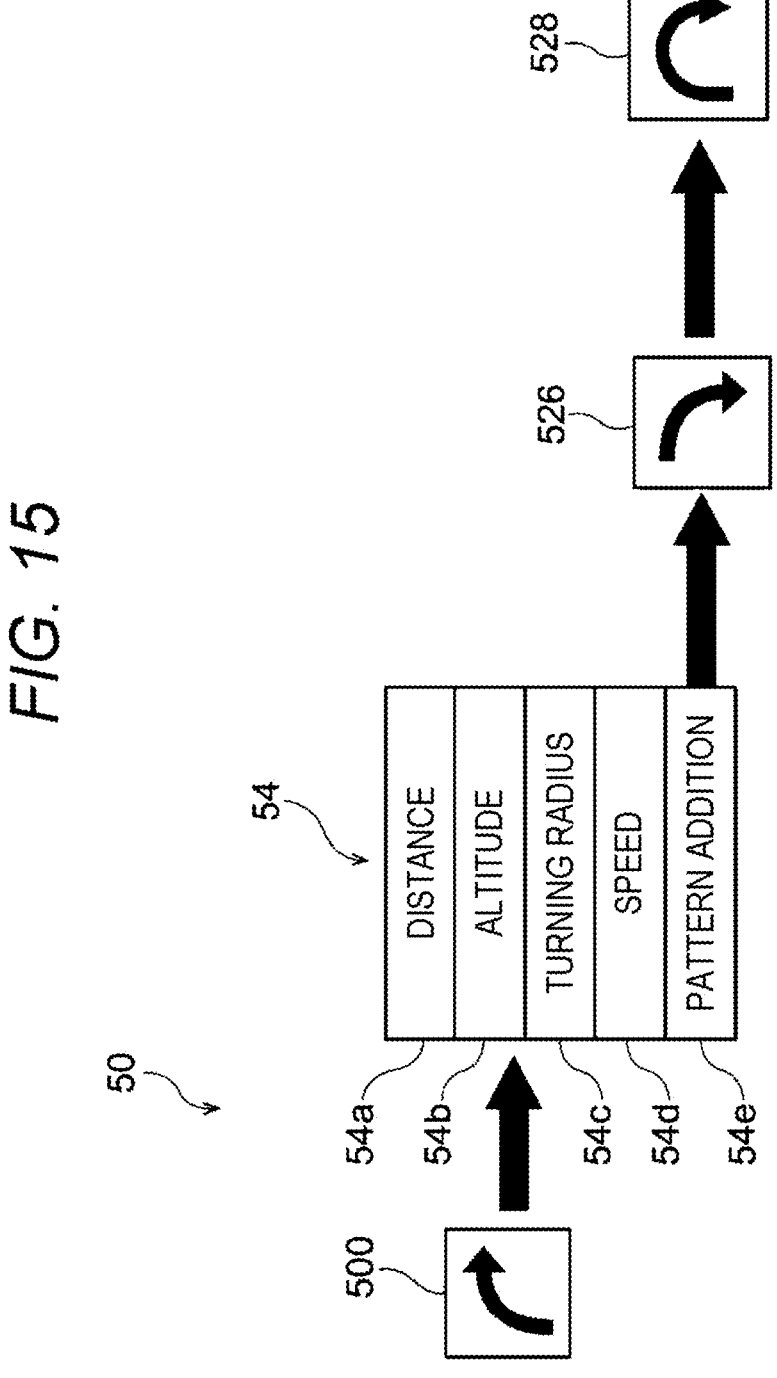
FIG. 15 is a diagram schematically illustrating an example of an editing screen of template objects.

FIG. 15 is a diagram schematically illustrating an example of an editing screen of a template object 504. For example, when the user presses the template object 504 for a long time, the control unit 120 determines that an editing instruction has been input, and causes the editing unit 140d to display an editing screen 54 of the template object 504. Next, when the button 54e is pressed and the user further presses a template object 506 for a long time, the editing unit 140d generates a template object 508 and adds the template object to the image area 84 (see FIG. 8). Setting information corresponding to the template object 504 and setting information corresponding to the template object 506 are associated with the template object 508. Furthermore, a template corresponding to the template object 508 is stored in the template storage unit 190 (see FIG. 2). Therefore, when template object 508 is selected in the timeline image area 80, a control signal based on the setting information corresponding to the template object 506 is generated following a control signal based on the setting information corresponding to the template object 504.

Figure 16:
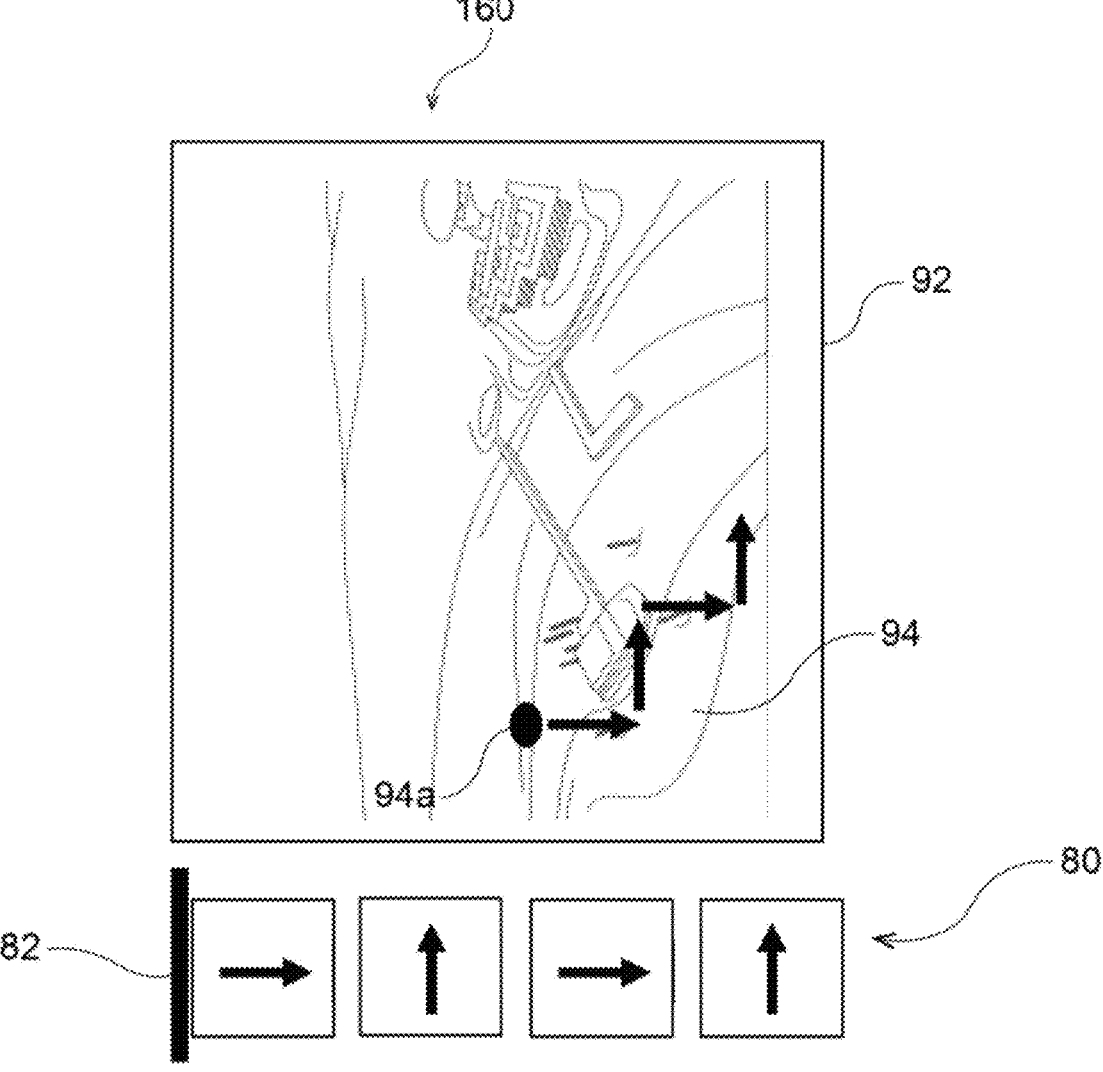
FIG. 16 is a diagram schematically illustrating a part of a screen of a display unit during flight.

An example of a screen of the display unit 160 during flight of the flight device 20 will be described with reference to FIGS. 16 and 17. FIG. 16 is a diagram schematically illustrating a part of a screen of the display unit 160 during flight. An imaging screen of the flight device 20 is displayed on a screen 92. Furthermore, a future flight route 94 by a template object selected in the timeline image area 80 is displayed on the screen 92. Here, a start point 94a corresponds to a position of the image line 82. As described above, the display control unit 140a generates the flight route 94 on the basis of the flight control information 54 (see FIG. 5) corresponding to the template object in the timeline image area 80 and the coordinates of the flight device 20, and displays the flight route on the display unit 160.

Figure 17:
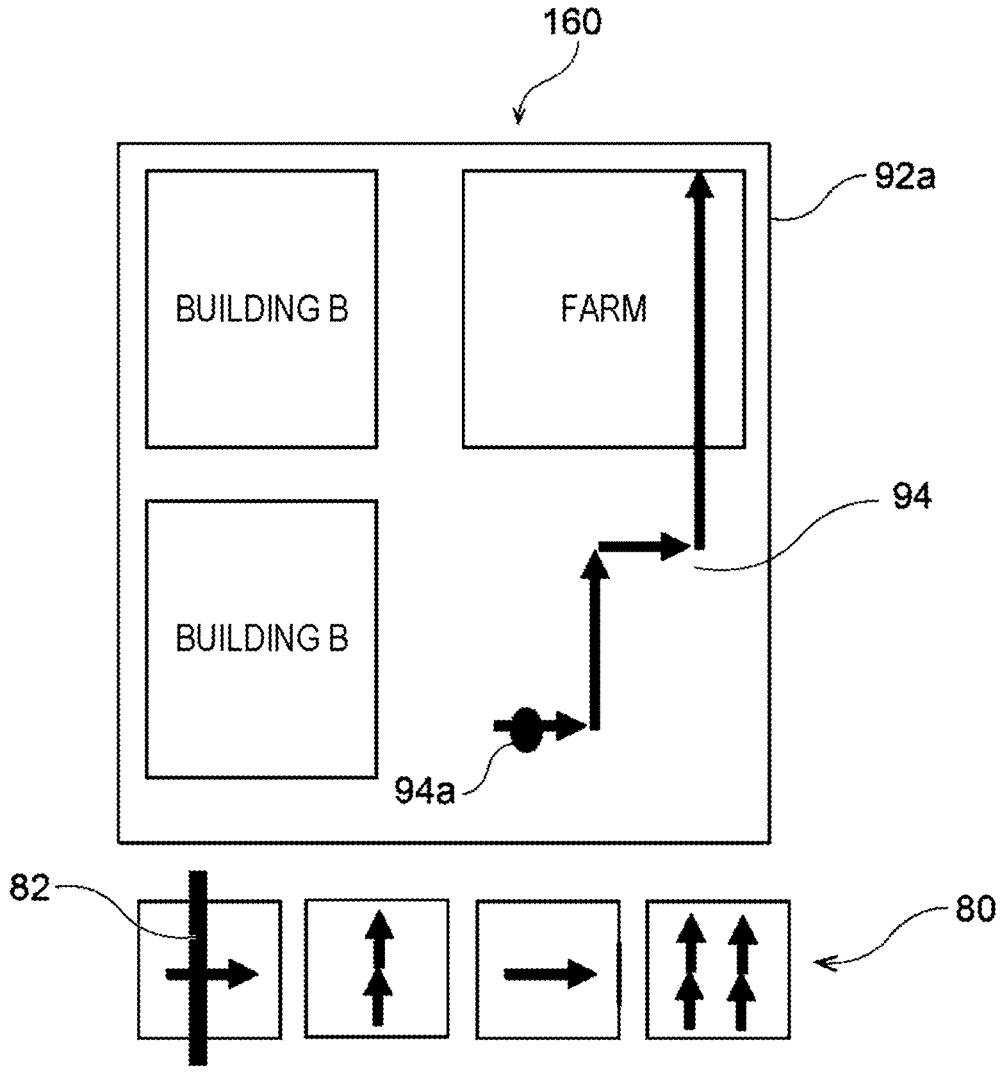
FIG. 17 is another diagram schematically illustrating a part of a screen of the display unit during flight.

FIG. 17 is another diagram schematically illustrating a part of a screen of the display unit 160 during flight. The timeline image area 80 of FIG. 17 includes template objects having a distance X times (X is a natural number of 2 or more). Therefore, distance length of a flight route of the flight route 94 generated by the display control unit 140a is also indicated by X times. A map screen corresponding to the flight route 94 of the flight device 20 is displayed on a screen 92a. As described above, the display control unit 140a causes the screen 92a to display a map corresponding to the flight route 94 on the basis of coordinates of the flight device 20 and the flight route 94.

As can be seen from these, since the flight route 94 scheduled to travel is displayed on the actual map screen, the flight route can be predicted more easily. Furthermore, in the template object in which the number of marks is X (X is a natural number of 2 or more) times, length of the flight route is displayed at X times, so that it is easy to image the distance of the flight route.

Figure 18:
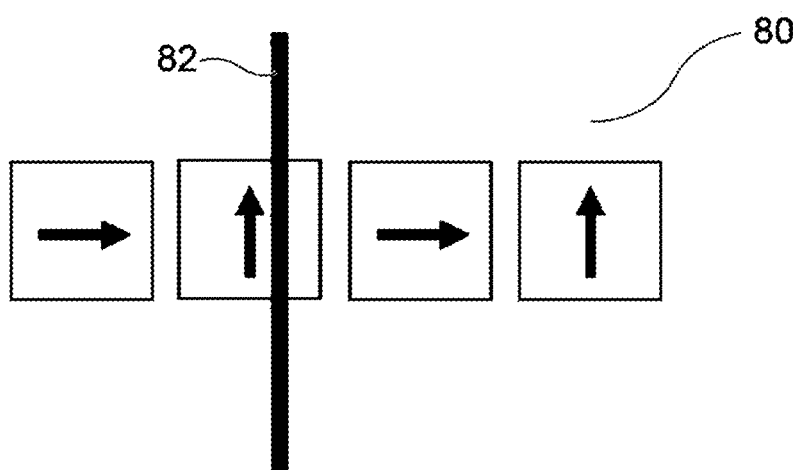
FIG. 18 is a diagram illustrating another display form of the timeline image area and an image line.

FIG. 18 is a diagram illustrating another display form of the timeline image area 80 and the image line 82. This is an example in which the image line 82 is fixed at a central portion of the timeline image area 80. The user can grasp that a left side of the image line 82 is a past flight route and a right side thereof is a future flight route. In this case, as the flight device 20 travels, a position of the template in the image line 82 moves from left to right.

Figure 19:
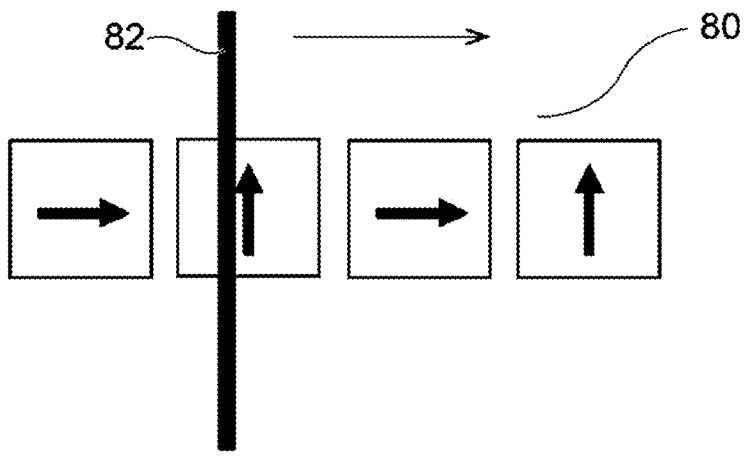
FIG. 19 is a diagram illustrating an example in which the image line moves with respect to the timeline image area.

FIG. 19 is a diagram illustrating an example in which the image line 82 moves with respect to the timeline image area 80. As the flight device 20 travels, the image line 82 moves from left to right with respect to the image line 82. Then, in a case where the image line 82 reaches a right end, a position of the template in the image line 82 moves from left to right according to the traveling of the flight device 20. In this case, since the image line 82 moves on an initial screen, it is easy to grasp a situation of a time-series change in the flight route.

Figure 20:
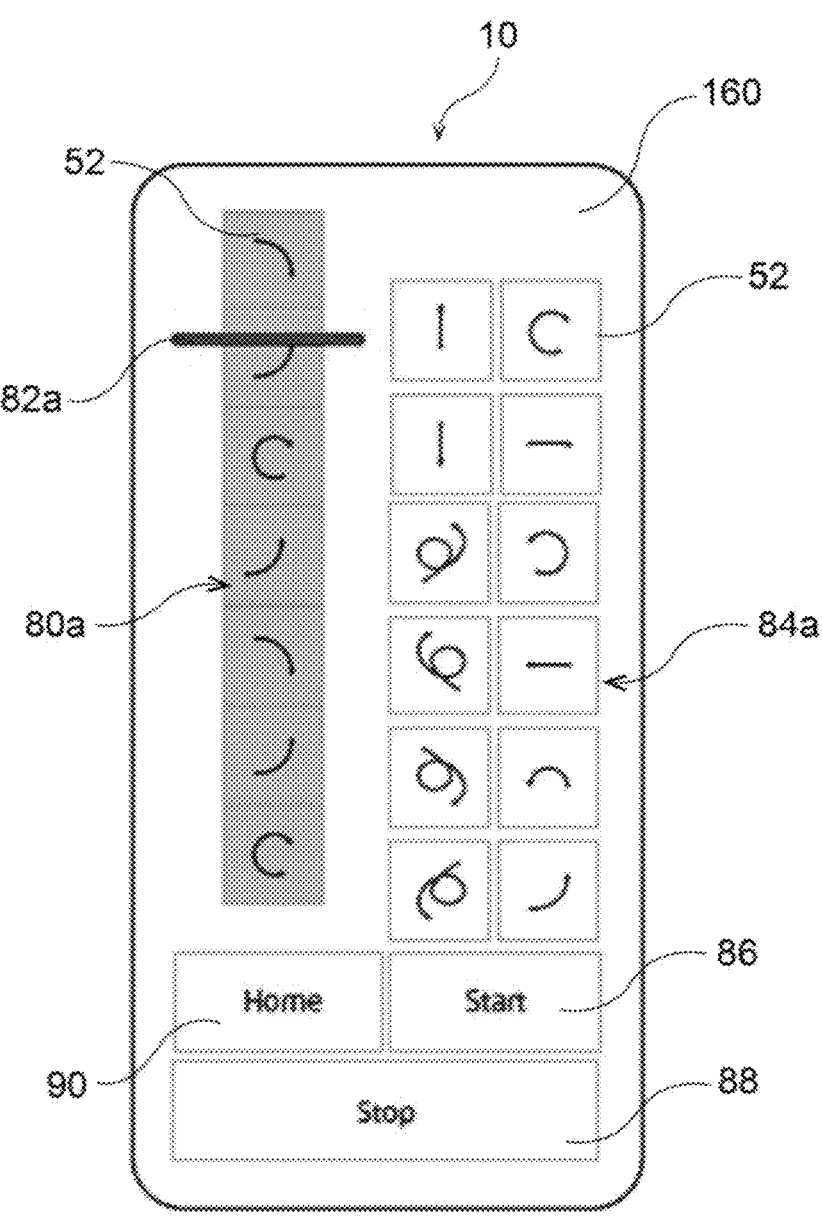
FIG. 20 is a diagram illustrating an example of another setting screen of templates displayed on the display unit by the display control unit.

FIG. 20 is a diagram illustrating an example of another template setting screen displayed on the display unit 160 by the display control unit 140*a*. A timeline image area 80*a* is an image illustrating an example in which the template objects 52 are vertically arranged as a timeline. A line image 82*a* is an image indicating an ongoing processing position. An image area 84*a* is an image illustrating an example in which the template objects 52 are arranged vertically. In this manner, it is also possible to change arrangement of the timeline image area 80*a* and the image area 84*a*.

Figure 21:
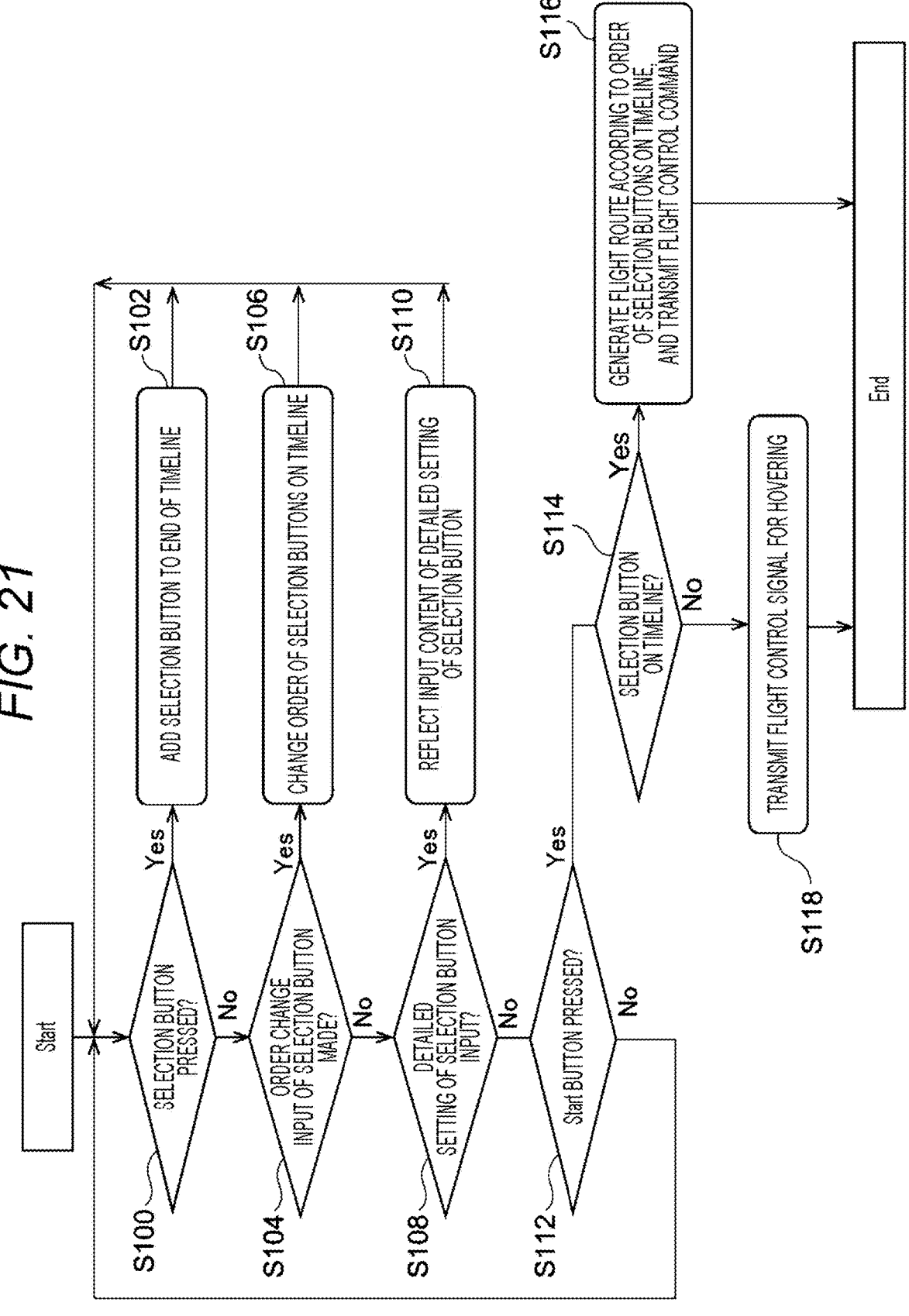
FIG. 21 is a flowchart illustrating an example of setting a flight route of the flight device.

FIG. 21 is a flowchart illustrating an example of setting a flight route of the flight device 20. Here, a case where a template setting screen is displayed on the display unit 160 in response to a request for creating flight route information will be described.

The selection unit 140*b* determines whether or not the template object (selection button) 52 in the image area 84 has been pressed (step S100). In a case where the selection unit 140*b* determines that the template object 52 has been pressed only within a predetermined time (YES in step S100), the selection unit 140*b* adds the pressed template object 52 in the image area 84 to an end of the timeline image area 80 (step S102), and repeats processing from step S100.

On the other hand, in a case where it is determined that the template object 52 has been pressed for the predetermined time or more (NO in step S100), the selection unit 140*b* determines whether or not an order change input has been made (step S104). In a case where it is determined that the order change input has been made (YES in step S104), the selection unit 140*b* changes the order of the template objects 52 in the timeline image area 80 (step S106), and repeats the processing from step S100. For example, the selection unit 140*b* moves the pressed template object 52 according to a coordinate locus of the template object 52 moved in the pressed state, sets the pressed template object in the timeline image area 80, and shifts a position of the other template object 52 interfering in the timeline image area 80 to the right or the left.

On the other hand, in a case where the selection unit 140*b* determines that the order change input has not been input (NO in step S104), the selection unit 140*b* determines whether or not edit setting has been input (step S108). In a case where it is determined that the edit setting has been input (YES in step S108), the selection unit 140*b* displays a new template object 52 in the image area 84 reflecting a change in setting information in the template object 52 (step S110), and repeats the processing from step S100. For example, in a case where the template object 52 is not moved in the pressed state for a predetermined time or more, the selection unit 140*b* determines that the edit setting has been input. Furthermore, a flight template 50 corresponding to the new template object 52 is stored in the template storage unit 190.

On the other hand, in a case where the selection unit 140*b* determines that the edit setting has not been input (NO in step S110), the control signal generation unit 140*c* determines whether or not the Start button 86 has been pressed (step S112). In a case where it is determined that the Start button 86 has not been pressed (NO in step S112), the control signal generation unit 140*c* repeats the processing from step S100.

On the other hand, in a case where it is determined that the Start button 86 has been pressed (YES in step S112), the control signal generation unit 140*c* determines whether or not the template object 52 has been set in the timeline image area 80 (step S114). In a case where the control signal generation unit 140*c* determines that the template object 52 has been set (YES in step S114), the control signal generation unit 140*c* generates a control signal including flight route information in accordance with the template object 52 set in the timeline image area 80, transmits the control signal to the flight device 20 via the control unit 120 and the communication unit 170 (step S114), and ends the processing.

On the other hand, in a case where the control signal generation unit 140*c* determines that the template object 52 has not been set (NO in step S114), the control signal generation unit 140*c* generates a control signal for hovering as a flight control signal for hovering, transmits the control signal to the flight device 20 via the control unit 120 and the communication unit 170 (step S114), and ends the processing.

FIG. 22 is a flowchart illustrating an example of setting a route while the flight device 20 is in flight.

First, the flight device 20 performs flight or hovering according to an order of the template objects 52 set in the timeline image area 80 (step S200).

Next, the selection unit 140*b* determines whether or not the template object (selection button) 52 in the timeline image area 80 and the image area 84 has been pressed (step S202). In a case where the selection unit 140*b* determines that the template object 52 in the timeline image area 80 and the image area 84 has been pressed (YES in step S202), the selection unit 140*b* performs order change, editing, addition, and deletion of the template object 52 in the timeline image area 80 and the image area 84 according to a situation such as a time when the template object 52 has been pressed and the presence or absence of movement of the template object (step S204), and repeats processing from step S200.

In a case where the selection unit 140*b* determines that the template object 52 in the timeline image area 80 and the image area 84 has not been pressed (NO in step S202), the control signal generation unit 140*c* determines whether or not the Stop button 88 has been pressed (step S206). In a case where it is determined that the Stop button 88 has been pressed (YES in step S206), the control signal generation unit 140*c* generates a control signal for hovering as a flight control signal for hovering, and transits the signal to the flight device 20 via the control unit 120 and the communication unit 170 (step S208). Subsequently, the control signal generation unit 140c determines whether or not the Start button 86 has been pressed (step S210). In a case where it is determined that the Start button has been pressed (YES in step S204), the processing from step S200 is repeated. On the other hand, in a case where it is determined that the Start button has not been pressed (NO in step S204), processing from step S208 is repeated.

On the other hand, in a case where the control signal generation unit 140c determines that the Stop button 88 has not been pressed (NO in step S206), the control signal generation unit 140c determines whether or not the Home button 90 has been pressed (step S212). In a case where it is determined that the Home button 90 has been pressed (YES in step S212), the control signal generation unit 140c generates a return control signal for returning to a position of home coordinates as a return flight control signal, transmits the signal to the flight device 20 via the control unit 120 and the communication unit 170 (step S214), and ends the processing. On the other hand, in a case where it is determined that the Home button 90 has not been pressed (NO in step S212), the control signal generation unit 140c repeats the processing from step S200.

Figure 23:
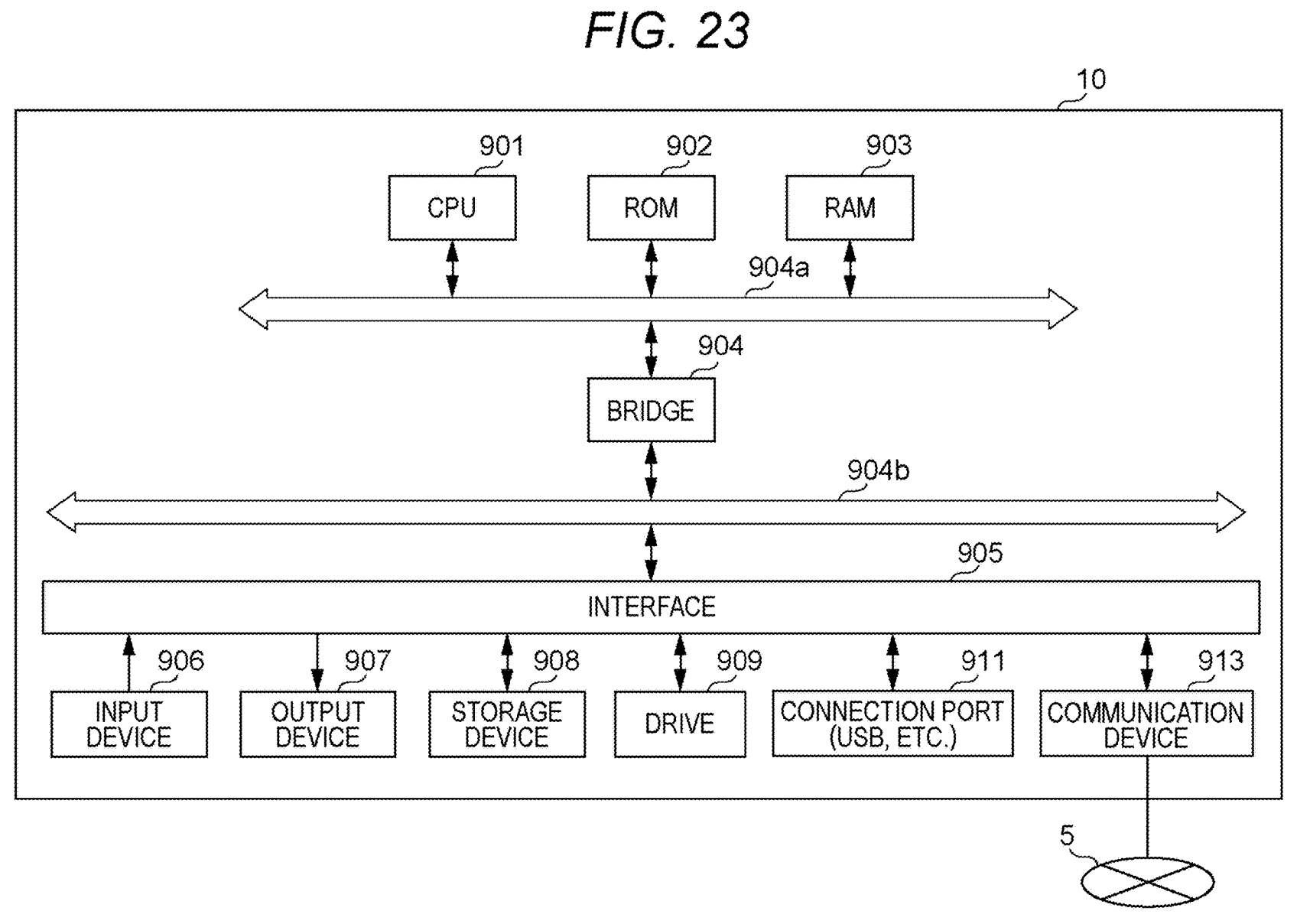

FIG. 23 is a diagram illustrating a hardware configuration example of the information processing terminal 10. The information processing terminal 10 according to the present embodiment can also be configured as illustrated in FIG. 23, for example. Hereinafter, the hardware configuration example of the information processing terminal 10 according to the present embodiment will be described on the basis of FIG. 23.

As described above, the information processing terminal 10 according to the present embodiment can be realized by a processing device such as a computer and the like. As illustrated in FIG. 23, the information processing terminal 10 includes a central processing unit (CPU) 901, a read only memory (ROM) 902, a random access memory (RAM) 903, and a host bus 904a. Furthermore, the information processing terminal 10 includes a bridge 904, an external bus 904b, an interface 905, an input device 906, an output device 907, a storage device 908, a drive 909, a connection port 911, and a communication device 913.

The CPU 901 serves as an arithmetic processing device and a control device, and controls overall operations in the information processing terminal 10 according to various programs. Furthermore, the CPU 901 may also be a microprocessor. The ROM 902 stores the program used by the CPU 901, operation parameters, and the like. The RAM 903 temporarily stores the program used in execution of the CPU 901, parameters which change as appropriate in the execution thereof, and the like. They are connected to each other by the host bus 904a including a CPU bus and the like.

The host bus 904a is connected to the external bus 904b such as a peripheral component interconnect/interface (PCI) bus via the bridge 904. Note that the host bus 904a, the bridge 904, and the external bus 904b are not necessarily configured separately, and these functions may be mounted on one bus.

The input device 906 includes an input means such as a mouse, a keyboard, a touch panel, a button, a microphone, a switch, and a lever for a user to input information, an input control circuit which generates an input signal on the basis of the input by the user and outputs the same to the CPU 901, and the like. The output device 907 includes, for example, a display device such as a liquid crystal display (LCD) device, an organic light emitting diode (OLED) device, and a lamp, and an audio output device such as a speaker.

The storage device 908 is an example of a storage unit of the information processing terminal 10, and is a device for storing data. The storage device 908 may include a storage medium, a recording device that records data on the storage medium, a reading device that reads data from the storage medium, a deletion device that deletes data recorded on the storage medium, and the like. The storage device 908 drives a hard disk and stores programs executed by the CPU 901 and various data.

The drive 909 is a reader-writer for a storage medium, and is built in or externally attached to the information processing terminal 10. The drive 909 reads out information recorded in a removable recording medium such as a magnetic disc, an optical disc, a magnetooptical disc, a semiconductor memory, and the like mounted thereon to output to the RAM 903.

The connection port 911 is an interface connected with an external device, and is a connection port to an external device capable of transmitting data by, for example, a universal serial bus (USB). Furthermore, the communication device 913 is, for example, a communication interface configured by a communication device and the like for connecting to a communication network 5. Furthermore, the communication device 913 may be a wireless local area network (LAN) compliant communication device, a wireless USB compliant communication device, or a wire communication device that performs communication by wire. Alternatively, the communication device 913 may be a device for wireless communication such as a global system for mobile communications (GSM), a wideband code division multiple access (LTE), or a low power wide area-network (LPWA).

The preferred embodiment of the present disclosure has been described above in detail with reference to the accompanying drawings, but the technical scope of the present disclosure is not limited to such examples. It is obvious that those with ordinary skill in the technical field of the present disclosure can arrive various variations or modifications within the scope of the technical idea described in the claims, and it is naturally understood that these also fall within the technical scope of the present disclosure.

As described above, according to the present embodiment, the control signal generation unit 140c generates the control signal including the flight route information corresponding to the template objects 500, 502, 504, and 506 according to the arrangement order of the template objects 500, 502, 504, and 506 set in the timeline image area 80. Since the flight route information is schematically illustrated in the template objects 500, 502, 504, and 506, a user can generate a control signal including flight route information along a flight image only by arranging the template objects 500, 502, 504, and 506 in the timeline image area 80.

Modification 1 of First Embodiment

An imaging system 1 according to Modification 1 of the first embodiment is different from the imaging system 1 according to the first embodiment in that a control signal to a flight device 20 is transmitted to an information processing terminal 10 via a transmitter 30 of the flight device 20.

Figure 24:
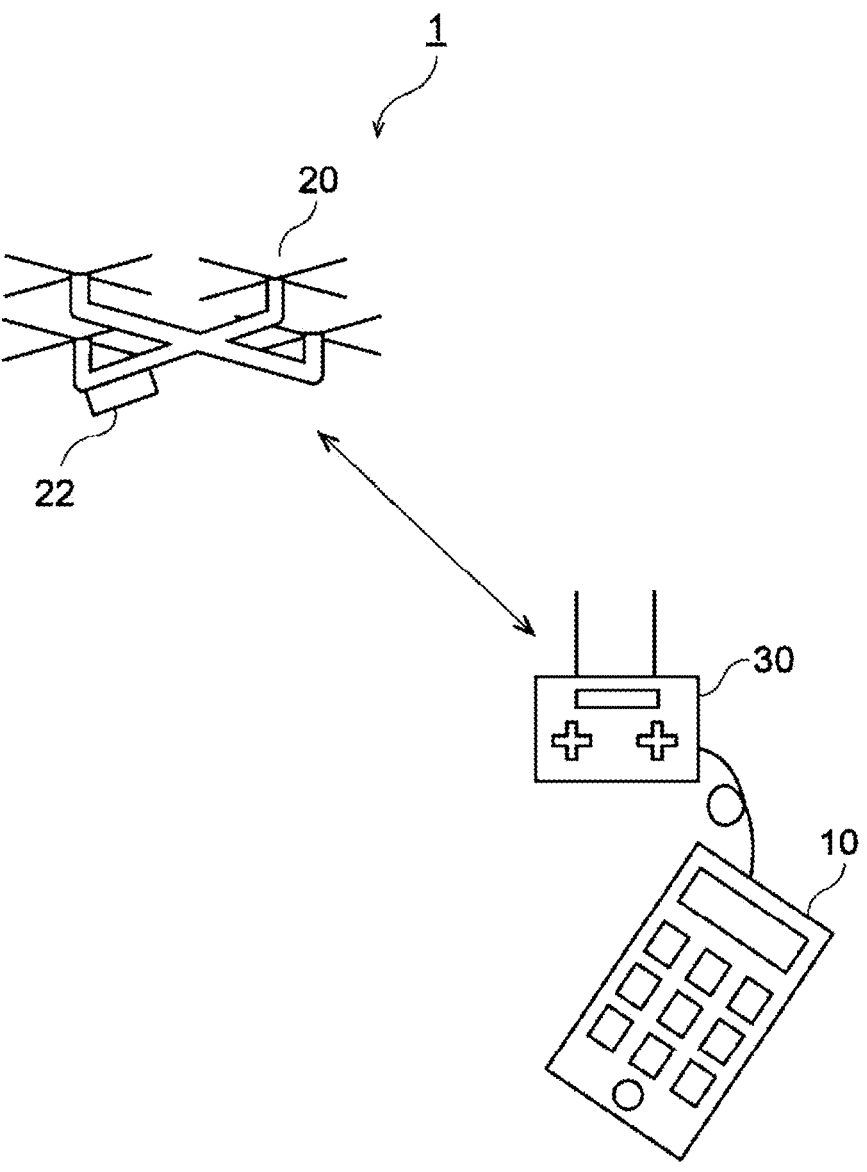
FIG. 24 is a schematic diagram illustrating an imaging system according to Modification 1 of the first embodiment.

FIG. 24 is a schematic diagram illustrating the imaging system 1 according to Modification 1 of the first embodiment. A control signal of the information processing terminal 10 is transmitted to the flight device 20 via the transmitter 30. The transmitter 30 is, for example, a proportional system. Therefore, the control signal of the information processing terminal 10 is converted into a signal for operating the flight device 20 via the transmitter 30.

In general, in order to fly the flight device 20 by the transmitter 30, it is necessary to operate by an operation button. On the other hand, in a case where the flight device 20 is caused to fly via the transmitter 30 by the control signal of the information processing terminal 10, it is possible to cause a systematic flight according to an order of template objects 52. At this time, a communication system of the transmitter 30 can be used.

Modification 2 of First Embodiment

An imaging system 1 according to Modification 2 of the first embodiment is different from the imaging system 1 according to the first embodiment in that a control signal to a flight device 20 is transmitted to an information processing terminal 10 via a base station 40.

Figure 25:
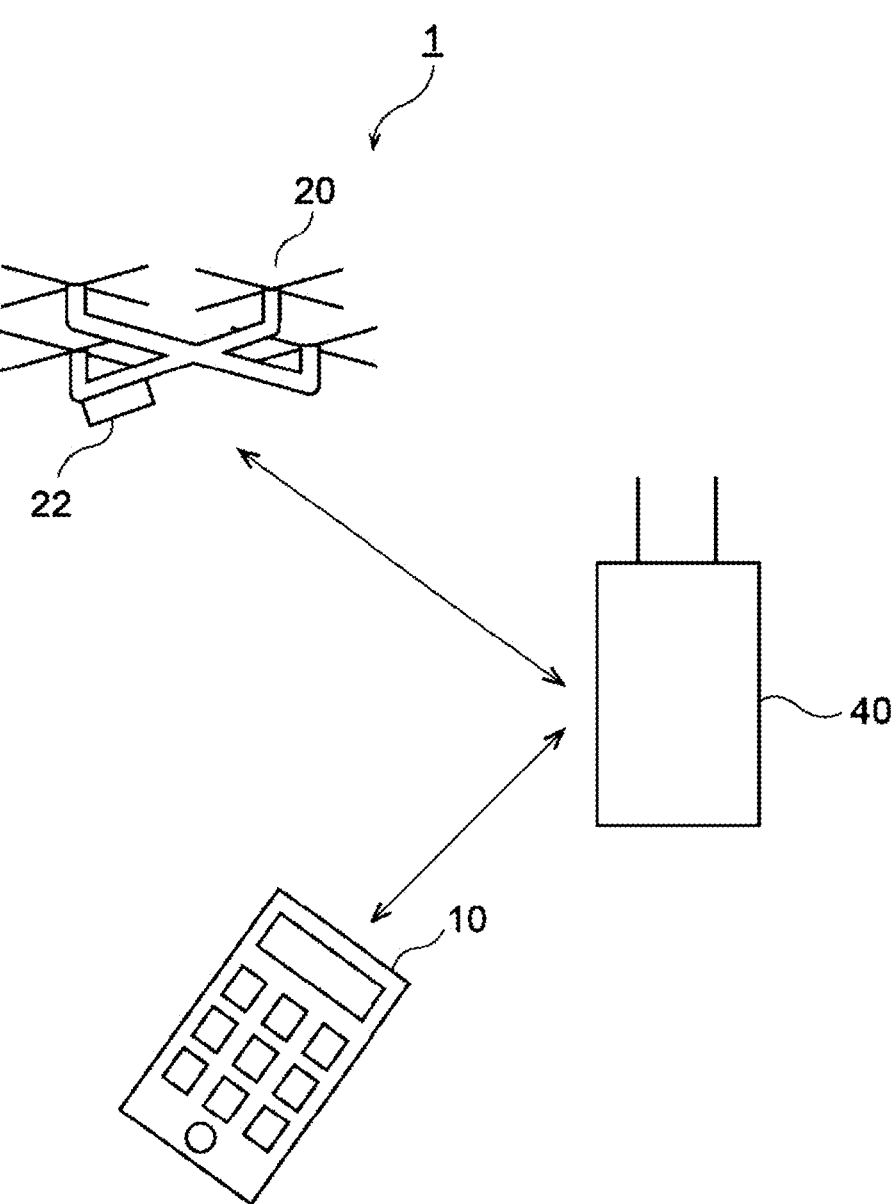
FIG. 25 is a schematic diagram illustrating an imaging system according to Modification 2 of the first embodiment.

FIG. 25 is a schematic diagram illustrating the imaging system 1 according to Modification 2 of the first embodiment. A control signal of the information processing terminal 10 is transmitted to the flight device 20 via the base station 40. Therefore, even if a radio wave of the information processing terminal 10 does not reach, a flight range can be expanded to a range in which the radio wave is transmitted via the base station 40.

Note that, although the flight device 20 includes the imaging device 22 in the embodiment described above, the present disclosure is not limited to such an example, and the flight device 20 may not necessarily include the imaging device 22. In this case, the flight route information may not include the imaging setting information. For example, by using the method of the embodiment described above in a case where the flight device 20 is caused to perform an aerial attraction and the like, the flight route of the flight device 20 can be easily set, and the flight device 20 can be safely flown.

Note that the present technology can have the following configurations.

(1) An information processing method including:
a display control step of causing a display unit to display a plurality of template objects schematically illustrating flight patterns; and
a control signal generation step of generating a control signal for a flight vehicle on the basis of flight control information including information on a flight route corresponding to a plurality of selected template objects selected from among the plurality of template objects.

(2) The information processing method according to (1), in which the control signal generation step includes generating a control signal corresponding to the plurality of selected template objects in a predetermined order.

(3) The information processing method according to (2), in which the control signal generation step incudes generating the control signal corresponding to the plurality of selected template objects on the basis of a selection order from among the plurality of template objects displayed on the display unit.

(4) The information processing method according to (3), in which the display control step incudes displaying the selected template objects side by side in an order of selection in a predetermined area of the display unit.

(5) The information processing method according to (4), in which the display control step includes changing and displaying an order of the plurality of selected template objects displayed side by side in the predetermined area according to a predetermined signal.

(6) The information processing method according to (4), in which the display control step includes deleting any of the plurality of selected template objects displayed side by side in the predetermined area according to a predetermined signal.

(7) The information processing method according to (4), in which the display control step includes adding a new selected template object to the plurality of selected template objects displayed side by side in the predetermined area according to a predetermined signal.

(8) The information processing method according to any one of (4) to (7), in which the display control step includes generating a flight route corresponding to each of the plurality of selected template objects displayed side by side in the predetermined area according to an arrangement order of the selected template objects, and causing the display unit to display the flight route.

(9) The information processing method according to any one of (4) to (8), in which the display control step includes causing the display unit to display an image line indicating a selected template object corresponding to a control signal being executed among the plurality of selected template objects displayed side by side in the predetermined area.

(10) The information processing method according to (9), in which the display control step includes fixing the image line and changing positions of the plurality of selected template objects according to execution of the control signal.

(11) The information processing method according to (9), in which the display control step includes changing a position of the image line according to execution of the control signal.

(12) The information processing method according to (8), in which the display control step includes causing the display unit to display a captured image based on position information of the flight vehicle, and causing positions of the flight route and the captured image to correspond to each other.

(13) The information processing method according to (8), in which the display control step includes causing the display unit to display a map based on position information of the flight vehicle, and causing positions of the flight route and the map to correspond to each other.

(14) The information processing method according to any one of (1) to (13), in which the flight control information includes at least any one of information of a distance, an altitude, a turning radius, and a speed.

(15) An information processing device including:
a display control unit that causes a display unit to display a plurality of template objects schematically illustrating a flight route; and
a control signal generation unit that generates a control signal for a flight vehicle on the basis of flight control information including information on the flight route corresponding to a plurality of selected template objects selected from among the plurality of template objects.

(16) An imaging system including:
a flight vehicle; and
an information processing device that controls the flight vehicle, in which 19 20 the information processing device includes a display control unit that causes a display unit to display a plurality of template objects schematically illustrating flight patterns, and a control signal generation unit that generates a control signal for the flight vehicle on the basis of flight control information including information on the flight route corresponding to a plurality of selected template objects selected from among the plurality of template objects.

(17) An imaging system including:

a flight vehicle;

a communication device that controls the flight vehicle; and an information processing device that controls the flight vehicle via the communication device, in which the information processing device includes a display control unit that causes a display unit to display a plurality of template objects schematically illustrating flight patterns, and a control signal generation unit that generates a control signal for the flight vehicle on the basis of flight control information including information on a flight route corresponding to a plurality of selected template objects selected from among the plurality of template objects.

(18) An imaging system including:

a flight vehicle; and an information processing device that controls the flight vehicle, in which the information processing device includes a display control unit that causes a display unit to display a plurality of template objects schematically illustrating flight patterns, a control signal generation unit that generates a control signal for the flight vehicle on the basis of flight control information including information on a flight route corresponding to a plurality of selected template objects selected from among the plurality of template objects, and a communication unit that communicates with the flight vehicle via a wireless base station.

(19) A program for causing a computer to execute:

a display control step of causing a display unit to display a plurality of template objects schematically illustrating flight patterns; and a control signal generation step of generating a control signal for a flight vehicle on the basis of flight control information including information on a flight route corresponding to a plurality of selected template objects selected from among the plurality of template objects.

(20) A computer-readable medium having recorded therein a program for causing a computer to execute:

a display control step of causing a display unit to display a plurality of template objects schematically illustrating flight patterns; and a control signal generation step of generating a control signal for a flight vehicle on the basis of flight control information including information on a flight route corresponding to a plurality of selected template objects selected from among the plurality of template objects.

Aspects of the present disclosure are not limited to the above-described individual embodiments, and include various modifications that may be conceived by those skilled in the art, and the effects of the present disclosure are not limited to the above-described content. That is, various additions, modifications, and partial deletions can be made without departing from the conceptual idea and spirit of the present disclosure derived from the contents defined in the claims and equivalents thereof.

REFERENCE SIGNS LIST

1 Imaging system
10 Information processing terminal
20 Flight device (flight vehicle)
30 Transmitter
40 Base station
140a Display control unit
140c Control signal generation unit
140d Editing unit

The invention claimed is:

1. An information processing method performed by control circuitry of an information processing device, the information processing method comprising:

displaying a plurality of template objects on a first part of a display screen, the plurality of template objects schematically illustrating possible flight patterns;

receiving a first user selection of a first template object of the plurality of template objects, followed by a second user selection of a second template object of the plurality of template objects;

concatenating the selected first and second template objects of the plurality of template objects into a flight route for a flight vehicle;

displaying the concatenated first and second template objects on a second part of the display screen;

receiving a user start command on start button displayed on the display screen;

based on the user start command, transmitting the flight route that includes the concatenated first and second template objects to the flight vehicle; and displaying a progress bar moving across the concatenated first and second template objects displayed on the second part of the display screen as the flight vehicle traverses the flight route.

2. The information processing method according to claim 1, wherein the selected first and second template objects are the same template object.

3. The information processing method according to claim 1, wherein the selected first and second template objects are different template objects.

4. The information processing method according to claim 1, wherein the concatenated first and second template objects are displayed in one of a horizontal or vertical aspect on the second part of the display screen.

5. The information processing method according to claim 1, further comprising:

reordering the concatenated first and second template objects based on a corresponding user input.

6. The information processing method according to claim 1, further comprising:

replacing one of the concatenated first and second template objects with another template object based on a corresponding user input.

7. The information processing method according to claim 1, further comprising:

receiving a third user selection of a third template object of the plurality of template objects;

concatenating the selected first, second and third template objects of the plurality of template objects into the flight route for the flight vehicle;

displaying the concatenated first, second and third template objects on the second part of the display screen; and one of:

deleting one of the concatenated first, second and third template objects from the second part of the display screen based on a corresponding user input, or reordering the concatenated first, second and third template objects on the second part of the display screen based on a corresponding user input.

8. The information processing method according to claim 1, further comprising:

prior to receiving the first user selection, receiving a first user input to the first template object;

based on the first user input, display flight control parameters associated with the first template object, wherein the flight control parameters include at least one of a distance control parameter, an altitude control parameter, a turning radius control parameter, or a speed control parameter;

receiving a second user selection of one of the flight control parameters;

adjusting the selected flight control parameter based on a corresponding user input.

9. The information processing method according to claim 1, further comprising:

displaying a captured image on captured image display area of the display screen; and superimposing the concatenated first and second template objects on the captured image.

10. The information processing method according to claim 1, further comprising:

displaying a map on a map display area of the display screen; and superimposing the concatenated first and second template objects on the map.

11. The information processing method according to claim 1, further comprising:

prior to receiving the first user selection, receiving a first user input to the first template object;

based on the first user input, display flight control parameters associated with the first template object, wherein the flight control parameters include at least one of a distance control parameter, an altitude control parameter, a turning radius control parameter, or a speed control parameter;

receiving a second user selection of one of the flight control parameters; and adjusting the selected flight control parameter based on a corresponding user input.

12. An information processing device including:

control circuitry configured to:

display a plurality of template objects on a first part of a display screen, the plurality of template objects schematically illustrating possible flight patterns;

receive a first user selection of a first template object of the plurality of template objects, followed by a second user selection of a second template object of the plurality of template objects;

concatenate the selected first and second template objects of the plurality of template objects into a flight route for a flight vehicle;

display the concatenated first and second template objects on a second part of the display screen;

receive a user start command on start button displayed on the display screen;

based on the user start command, transmitting the flight route that includes the concatenated first and second template objects to the flight vehicle; and display a progress bar moving across the concatenated first and second template objects displayed on the second part of the display screen as the flight vehicle traverses the flight route.

13. An imaging system comprising:

a flight vehicle; and an information processing device that controls the flight vehicle, wherein the information processing device includes control circuitry configured to:

display a plurality of template objects on a first part of a display screen, the plurality of template objects schematically illustrating possible flight patterns;

receive a first user selection of a first template object of the plurality of template objects, followed by a second user selection of a second template object of the plurality of template objects;

concatenate the selected first and second template objects of the plurality of template objects into a flight route for a flight vehicle;

display the concatenated first and second template objects on a second part of the display screen;

receive a user start command on start button displayed on the display screen;

based on the user start command, transmitting the flight route that includes the concatenated first and second template objects to the flight vehicle; and display a progress bar moving across the concatenated first and second template objects displayed on the second part of the display screen as the flight vehicle traverses the flight route.

14. An imaging system comprising:

a flight vehicle;

a transceiver that controls the flight vehicle; and an information processing device that controls the flight vehicle via the transceiver, wherein the information processing device includes control circuitry configured to:

display a plurality of template objects on a first part of a display screen, the plurality of template objects schematically illustrating possible flight patterns;

receive a first user selection of a first template object of the plurality of template objects, followed by a second user selection of a second template object of the plurality of template objects;

concatenate the selected first and second template objects of the plurality of template objects into a flight route for a flight vehicle;

display the concatenated first and second template objects on a second part of the display screen;

receive a user start command on start button displayed on the display screen;

based on the user start command, transmitting the flight route that includes the concatenated first and second template objects to the flight vehicle; and display a progress bar moving across the concatenated first and second template objects displayed on the second part of the display screen as the flight vehicle traverses the flight route.

15. An imaging system comprising:

a flight vehicle; and an information processing device that controls the flight vehicle, wherein the information processing device includes control circuitry configured to:

display a plurality of template objects on a first part of a display screen, the plurality of template objects schematically illustrating possible flight patterns;

receive a first user selection of a first template object of the plurality of template objects, followed by a second user selection of a second template object of the plurality of template objects;

concatenate the selected first and second template objects of the plurality of template objects into a flight route for a flight vehicle;

display the concatenated first and second template objects on a second part of the display screen;

receive a user start command on start button displayed on the display screen;

based on the user start command, transmitting the flight route that includes the concatenated first and second template objects to the flight vehicle; and display a progress bar moving across the concatenated first and second template objects displayed on the second part of the display screen as the flight vehicle traverses the flight route.

16. A non-transitory computer-readable medium having recorded therein a program for causing a computer to execute a method comprising:

displaying a plurality of template objects on a first part of a display screen, the plurality of template objects schematically illustrating possible flight patterns;

receiving a first user selection of a first template object of the plurality of template objects, followed by a second user selection of a second template object of the plurality of template objects;

concatenating the selected first and second template objects of the plurality of template objects into a flight route for a flight vehicle;

displaying the concatenated first and second template objects on a second part of the display screen;

receiving a user start command on start button displayed on the display screen;

based on the user start command, transmitting the flight route that includes the concatenated first and second template objects to the flight vehicle; and displaying a progress bar moving across the concatenated first and second template objects displayed on the second part of the display screen as the flight vehicle traverses the flight route.

* * * * *